(12) United States Patent
Choi et al.

(10) Patent No.: US 12,335,041 B2
(45) Date of Patent: Jun. 17, 2025

(54) METHOD AND DEVICE FOR REPEATEDLY TRANSMITTING UPLINK CONTROL CHANNEL IN WIRELESS CELLULAR COMMUNICATION SYSTEM

(71) Applicant: Samsung Electronics Co., Ltd., Suwon-si (KR)

(72) Inventors: Seunghoon Choi, Suwon-si (KR); Jinkyu Kang, Suwon-si (KR); Youngbum Kim, Suwon-si (KR); Taehyoung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 395 days.

(21) Appl. No.: 17/778,948

(22) PCT Filed: Nov. 26, 2020

(86) PCT No.: PCT/KR2020/016931
§ 371 (c)(1),
(2) Date: May 23, 2022

(87) PCT Pub. No.: WO2021/107631
PCT Pub. Date: Jun. 3, 2021

(65) Prior Publication Data
US 2023/0028762 A1    Jan. 26, 2023

Related U.S. Application Data

(60) Provisional application No. 62/940,837, filed on Nov. 26, 2019.

(51) Int. Cl.
*H04W 4/00* (2018.01)
*H04L 1/08* (2006.01)
*H04W 72/21* (2023.01)

(52) U.S. Cl.
CPC ............... *H04L 1/08* (2013.01); *H04W 72/21* (2023.01)

(58) Field of Classification Search
CPC ....... H04L 1/08; H04L 1/1858; H04L 1/1896; H04L 5/0094; H04L 5/0055;
(Continued)

(56) References Cited

U.S. PATENT DOCUMENTS 9,907,055 B2    2/2018   Yang et al.
10,616,916 B2   4/2020   Kim et al.
(Continued)

FOREIGN PATENT DOCUMENTS

KR    10-2018-0131328 A    12/2018
WO    2015/012665 A1       1/2015
(Continued)

OTHER PUBLICATIONS

Wilus Inc., Remaining Issues on HARQ-ACK Transmission, R1-1813531, 3GPP TSG RAN WG1 Meeting #95, Nov. 11, 2018, Spokane, USA.
(Continued)

*Primary Examiner* — Thai Dinh Hoang
(74) *Attorney, Agent, or Firm* — Jefferson IP Law, LLP

(57) ABSTRACT

The present disclosure relates to a communication technique that merges IoT technology with a 5G communication system for supporting higher data transmission rates than 4G systems, and a system for same. The present disclosure may be applied to intelligent services (for example, smart homes, smart buildings, smart cities, smart cars or connected cars, healthcare, digital education, retail business, security and safety-related services, etc.) on the basis of 5G communication technology and IoT-related technology. The invention of the present disclosure is a method performed by a terminal of a communication system, the method being
(Continued)

characterized by comprising receiving physical uplink control channel (PUCCH) setting information from a base station, receiving a downlink control channel (DCI) which schedules downlink data from the base station, receiving the downlink data, and repeatedly transmitting, to the base station, hybrid automatic repeat request acknowledgement (HARQ-ACK) information for the downlink data on the PUCCH, wherein the PUCCH setting information includes at least one piece of information among a plurality of PUCCH formats for repeatedly transmitting the PUCCH, a set of one or more start symbols, a set of one or more numbers of PUCCH symbols, and the total number of slots or symbols for finishing the PUCCH repetition.

16 Claims, 11 Drawing Sheets

(58) Field of Classification Search
CPC .... H04L 1/1812; H04L 1/1864; H04W 72/21; H04W 72/1273; H04W 72/23
See application file for complete search history.

(56) References Cited

U.S. PATENT DOCUMENTS

| | | | |
|---|---|---|---|
| 10,708,894 B2 * | 7/2020 | Myung | ................ H04W 72/02 |
| 10,880,847 B2 | 12/2020 | Kwak et al. | |
| 10,986,616 B2 | 4/2021 | Kim et al. | |
| 2016/0014628 A1 | 1/2016 | Kim | |
| 2018/0097599 A1 | 4/2018 | Lee et al. | |
| 2019/0037569 A1 | 1/2019 | Lee et al. | |
| 2019/0261356 A1 | 8/2019 | Myung et al. | |
| 2020/0008156 A1 * | 1/2020 | Yin | ........................ H04L 1/1858 |
| 2020/0008189 A1 * | 1/2020 | Yin | ........................ H04L 1/1858 |
| 2020/0154427 A1 | 5/2020 | Choi et al. | |
| 2020/0252179 A1 | 8/2020 | Kim et al. | |
| 2020/0252954 A1 | 8/2020 | Kim et al. | |
| 2023/0014728 A1 * | 1/2023 | Ly | .......................... H04W 72/51 |
| 2023/0262712 A1 * | 8/2023 | Park | ........................ H04L 1/08 370/336 |

FOREIGN PATENT DOCUMENTS

| | | | | |
|---|---|---|---|---|
| WO | 2018/030783 A1 | | 2/2018 | |
| WO | WO-2018203657 A1 | * | 11/2018 | ........... H04L 5/0007 |
| WO | WO-2019050381 A1 | * | 3/2019 | ........... H04L 1/0006 |
| WO | WO-2019099670 A1 | * | 5/2019 | ........... H04L 1/1819 |
| WO | WO-2019192539 A1 | * | 10/2019 | ........... H04L 5/0055 |
| WO | WO-2020026296 A1 | * | 2/2020 | ........... H04L 1/1819 |
| WO | WO-2022208472 A1 | * | 10/2022 | ........... H04L 1/0026 |

OTHER PUBLICATIONS

European Search Report dated Oct. 28, 2022,, issued in European Application No. 20892492.8.
European Office Action dated Sep. 13, 2024, issued in European Application No. 20 892 492.8-1206.

* cited by examiner

METHOD AND DEVICE FOR REPEATEDLY TRANSMITTING UPLINK CONTROL CHANNEL IN WIRELESS CELLULAR COMMUNICATION SYSTEM

TECHNICAL FIELD

The disclosure relates to a method and a device for repeatedly transmitting uplink transmission channels in a wireless communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" communication system or a "Post LTE" system. The 5G communication system is considered to be implemented in ultrahigh frequency (mmWave) bands (e.g., 60 GHz bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (cloud RAN) as the above-described big data processing technology may also be considered an example of convergence of the 5G technology with the IoT technology.

Research is ongoing in relation to uplink transmission in consideration of a case in which a lot of traffic needs to be transmitted in uplink and a case in which a terminal having a low transmission power performs uplink transmission.

DISCLOSURE OF INVENTION

Technical Problem

The disclosure proposes a method and a device for efficiently performing repeated transmission of an uplink control channel in order to increase coverage of an uplink signal and efficiently perform uplink transmission using limited transmission power of a terminal.

Solution to Problem

The disclosure for solving the above task relates to a method performed by a terminal of a communication system, the method including receiving physical uplink control channel (PUCCH) configuration information from a base station, receiving a downlink control channel (DCI) for scheduling of downlink data from the base station, and receiving the downlink data, and repeatedly transmitting hybrid automatic repeat request acknowledgment (HARQ-ACK) information for the downlink data on a PUCCH to the base station, wherein the PUCCH configuration information includes at least one piece of information among multiple PUCCH formats for performing repeated PUCCH transmission, a set of one or more start symbols, a set of one or more numbers of PUCCH symbols, and the total number of slots or symbols for termination of PUCCH repetition.

A method performed by a base station of a communication system includes transmitting physical uplink control channel (PUCCH) configuration information to a terminal, transmitting a downlink control channel (DCI) for scheduling of downlink data to the terminal, and transmitting the downlink data, and repeatedly receiving, from the terminal, hybrid automatic repeat request acknowledgment (HARQ-ACK) information for the downlink data on a PUCCH, wherein the PUCCH configuration information includes at least one piece of information among multiple PUCCH formats for performing repeated PUCCH transmission, a set of one or more start symbols, a set of one or more numbers of PUCCH symbols, and the total number of slots or symbols for termination of PUCCH repetition.

A terminal of a communication system includes a transceiver, and a controller configured to perform control to receive physical uplink control channel (PUCCH) configuration information from a base station, receive a downlink control channel (DCI) for scheduling of downlink data from the base station and receive the downlink data, and repeatedly transmit, to the base station, hybrid automatic repeat request acknowledgment (HARQ-ACK) information for the downlink data on a PUCCH, wherein the PUCCH configuration information includes at least one piece of information among multiple PUCCH formats for performing repeated PUCCH transmission, a set of one or more start symbols, a set of one or more numbers of PUCCH symbols, and the total number of slots or symbols for termination of PUCCH repetition.

A base station of a communication system includes a transceiver, and a controller configured to perform control to transmit physical uplink control channel (PUCCH) configuration information to a terminal, transmit a downlink control channel (DCI) for scheduling of downlink data to the terminal and transmit the downlink data, and repeatedly receive, from the terminal, hybrid automatic repeat request acknowledgment (HARQ-ACK) information for the downlink data on a PUCCH, wherein the PUCCH configuration information includes at least one piece of information among multiple PUCCH formats for performing repeated PUCCH transmission, a set of one or more start symbols, a set of one or more numbers of PUCCH symbols, and the total number of slots or symbols for termination of PUCCH repetition.

Advantageous Effects of Invention

According to an embodiment of the disclosure, via efficient repeated transmission of an uplink control channel, coverage of an uplink signal can be increased and reliable uplink transmission is possible, so that a service can be effectively provided in a wireless communication system.

MODE FOR THE INVENTION

Figure 1:
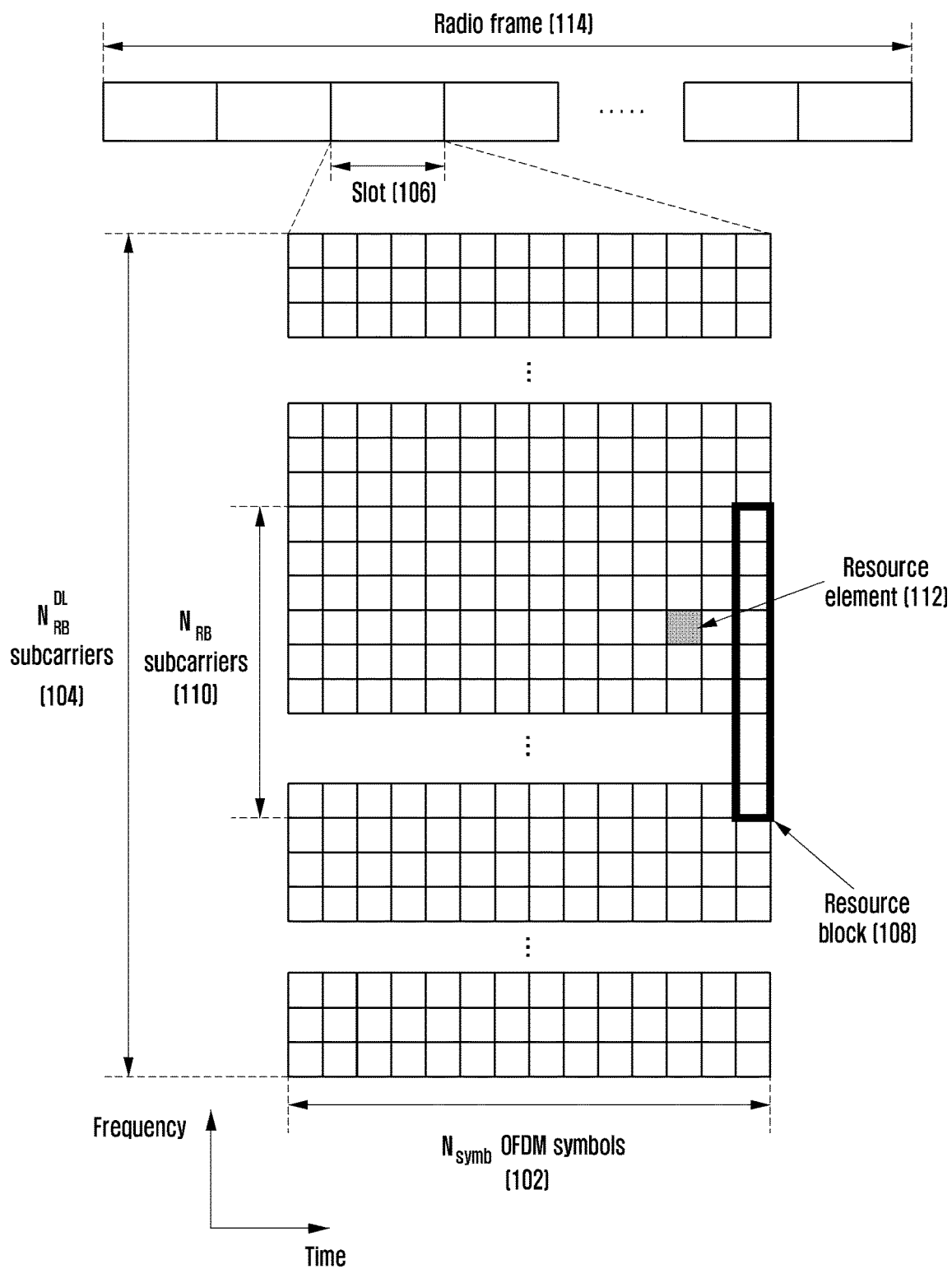
FIG. 1 is a diagram illustrating a transmission structure of a time-frequency domain which is a radio resource area of a 5G communication system.

Hereinafter, embodiments will be described in detail with reference to the accompanying drawings.

In describing the embodiments, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

A wireless communication system has moved away from providing early voice-oriented services, and is developing into broadband wireless communication systems that provide high-speed and high-quality packet data services, such as communication standards, for example, high speed packet access (HSPA), long-term evolution (LTE) or evolved universal terrestrial radio access (E-UTRA), and LTE-advanced (LTE-A) of 3GPP, high-rate packet data (HRPD) and ultra-mobile broadband (UMB) of 3GPP2, 802.16e of IEEE, and the like. Further, communication standards for 5G or new radio (NR) are generated on the basis of 5th generation wireless communication system.

In the 5G or NR system, which is a typical example of a broadband wireless communication system, an orthogonal frequency division multiplexing (OFDM) scheme is adopted in downlink (DL) and uplink. In detail, a cyclic-prefix OFDM (CP-OFDM) scheme is adopted in downlink, and a discrete Fourier transform spreading OFDM (DFT-S-OFDM) scheme is adopted in addition to the CP-OFDM in uplink. Uplink refers to a radio link in which a terminal (including a user equipment (UE) or a mobile station (MS), a cellular phone, a smartphone, a computer, or a multimedia system capable of performing a communication function) transmits a data signal or a control signal to a base station (which is at least one of a gNode B, an eNode B, a base station (BS), a radio access unit, a base station controller, or a node on a network, and may be understood as a subject performing resource allocation for a terminal), and downlink refers to a radio link via which a base station transmits a data signal or a control signal to a terminal. In such a multiple access scheme, in general, data or control information may be distinguished by assigning and operating time-frequency resources, at which data or control information of each user is transmitted, so as not to overlap each other, that is, to establish orthogonality.

The 5G or NR system adopts a hybrid automatic repeat request (HARQ) scheme in which corresponding data is retransmitted in a physical layer when a decoding failure occurs in initial transmission. In the HARQ scheme, when a receiver fails to correctly decode data, the receiver transmits negative acknowledgment (NACK) informing a transmitter of a decoding failure, so as to enable the transmitter to retransmit the data in a physical layer. The receiver improves data reception performance, by combining data, which is retransmitted by the transmitter, with the data for which decoding has failed previously. Further, when the receiver correctly decodes the data, the receiver may transmit information (acknowledgment, ACK) indicating a success of decoding to the transmitter so as to allow the transmitter to transmit new data.

The NR system, i.e., new 5G communication, is designed so that various services are freely multiplexed in time and frequency resources, and accordingly, a waveform, numerology, a reference signal, and/or the like may be assigned dynamically or freely according to the needs of corresponding services. In order to provide an optimal service to a terminal in wireless communication, optimization data transmission via measurement of an interference amount and a channel quality is important, and therefore accurate channel state measurement is essential. However, unlike 4G communication, in which channel and interference characteristics do not change significantly according to frequency resources, in the case of 5G or NR channels, because channel and interference characteristics vary significantly depending on services, it is necessary to support a subset of a frequency resource group (FRG) level, which enables measurement by division. In the 5G or NR system, types of supported services may be divided into categories, such as enhanced mobile broadband (eMBB), massive machine type communications (MMTC), and ultra-reliable and low-latency communications (URLLC). The eMBB is a service aimed at high-speed transmission of high-capacity data, the mMTC is a service aimed at minimizing a terminal power and accessing multiple terminals, and the URLLC is a service aimed at high reliability and low latency. Different requirements may be applied depending on types of services applied to the terminal.

Among the above-mentioned services, because the URLLC service aims at high reliability and low latency, there may be a need to transmit control information and data information, which may be transmitted on a physical channel, at a low coding rate. In the case of control information, a function of repeated transmission of control information has been already introduced in MTC or narrow band Internet-of-things (NB-IoT) services of an LTE system. A purpose of introducing the same is to provide high coverage for terminals having a small bandwidth, wherein a latency time is not sufficiently considered. A minimum unit of repeated transmission of control information is fixed in units of subframes on the basis of LTE. In order to support the URLLC service in the NR or 5G system, it is necessary to adopt a mode for repeated transmission of control information, which can improve reliability and requires a less latency time. Therefore, the disclosure basically considers a situation in which control information is repeatedly transmitted at a slot. In addition, a situation where control information may be repeatedly transmitted over a slot boundary is also be considered. Via operations provided in the disclosure, it is possible for a terminal to more quickly detect control information transmitted from a base station with higher reliability.

In the disclosure, terms are defined in consideration of respective functions, and may vary depending on intention or usage of users or operators. Therefore, the definition should be based on contents throughout the specification. Hereinafter, in the disclosure, an NR system is described as an example, but the disclosure is not limited thereto. Embodiments may be applied to various communication systems having similar technical backgrounds or channel forms. Further, the disclosure may be applied to other communication systems via some modifications without departing from the scope of the disclosure, according to determination by those skilled in the art.

In the disclosure, the existing terms of physical channel and signal may be used interchangeably with data signal or control signal. For example, although a physical downlink shared channel (PDSCH) is a physical channel through which data is transmitted, the PDSCH may be referred to as data in the disclosure.

In the disclosure, higher signaling (may be used interchangeably with higher layer signaling, higher signal, higher configuration, etc.) is a method of transferring a signal from a base station to a terminal through a physical downlink data channel or a method of transferring a signal from a terminal to a base station through a physical uplink data channel, and may also be referred to as RRC signaling or a medium access control (MAC) control element (CE).

In 3GPP Release 17, discussion on NR RedCap (reduced capability, low complexity) terminal standards has begun, wherein the NR RedCap terminal standards enable data transmission or reception by accessing a 5G communication system while reducing terminal complexity in order to support technologies, such as sensors, surveillance cameras, and smart watches. An actual use case, such as a video surveillance camera that generates a lot of traffic in an uplink, is considered as one of the low-complexity terminals, and a need for standard support for coverage improvement and enhancement is emerging for a terminal having a low transmission power.

Accordingly, in relation to a method for transmitting a PUCCH in multiple slots to improve coverage and reducing delay due to repetition, the disclosure provides terminal operations for a terminal to perform PUCCH transmission in multiple slots, such as format determination for repeated PUCCH transmission, configuration for repeated PUCCH transmission, a method of repeated PUCCH transmission using multiple start positions and intervals in one slot, a method of counting the number of times during repeated PUCCH transmission, and a method of varying the number of counting times depending on capability of a terminal or a base station configuration.

FIG. 1 is a diagram illustrating a transmission structure of a time-frequency domain which is a radio resource area of a 5G communication system.

Referring to FIG. 1, a horizontal axis represents a time domain and a vertical axis represents a frequency domain in a radio resource area. A minimum transmission unit in the time domain is an OFDM symbol, and the $N_{symb}$ number of OFDM symbols 102 are gathered to constitute one slot 106. A length of a subframe may be defined to be 1.0 ms and a radio frame 114 may be defined to be 10 ms. A minimum transmission unit in a frequency domain is a subcarrier, and a bandwidth of the entire system transmission bandwidth may include a total of the NBW number of subcarriers 104. Such a specific value may be applied variably depending on the system.

A basic unit of a time-frequency resource area is a resource element (RE) 112, which may be represented by an OFDM symbol index and a subcarrier index. A resource block (RB) 108 or a physical resource block (PRB) may be defined to be the $N_{symb}$ number of consecutive OFDM symbols 102 in the time domain and the $N_{RB}$ number of consecutive subcarriers 110 in the frequency domain. Therefore, one RB 108 may include $N_{symb} \times N_{RB}$ REs 112.

In general, a minimum transmission unit of data is an RB unit. In a 5G or NR system, in general, $N_{symb}=14$, $N_{RB}=12$, and NBW and $N_{RB}$ may be proportional to a bandwidth of a system transmission band. A data rate increases in proportion to the number of RBs scheduled for a terminal. In the 5G or NR system, a downlink transmission bandwidth and an uplink transmission bandwidth may be different in a case of an FDD system that operates by dividing a downlink and an uplink by frequency. A channel bandwidth represents an RF bandwidth corresponding to a system transmission bandwidth. Table 1 below shows the correspondence between a channel bandwidth and a system transmission bandwidth defined in an LTE system that is 4th generation wireless communication, before the 5G or NR system. For example, in an LTE system having a channel bandwidth of 10 MHz, a transmission bandwidth includes 50 RBs.

TABLE 1

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

In the 5G or NR system, operations may be performed at a channel bandwidth wider than the channel bandwidths of LTE shown in Table 1. Table 2 shows the correspondence between a system transmission bandwidth, a channel bandwidth, and a subcarrier spacing (SCS) in the 5G or NR systems.

TABLE 2

| | SCS [kHz] | Channel bandwidth $BW_{Channel}$ [MHz] | | | | | | | | | |
|---|---|---|---|---|---|---|---|---|---|---|---|
| | | 5 | 10 | 15 | 20 | 25 | 40 | 50 | 60 | 80 | 100 |
| Maximum Transmission bandwidth Maximum Transmission bandwidth $N_{RB}$ | 15 | 25 | 52 | 79 | 106 | 133 | 216 | 270 | N.A. | N.A. | N.A. |
| | 30 | 11 | 24 | 38 | 51 | 65 | 106 | 133 | 162 | 217 | 273 |
| | 60 | N.A. | 11 | 18 | 24 | 31 | 51 | 65 | 79 | 107 | 135 |

Scheduling information on downlink data or uplink data in the 5G or NR system is transferred from a base station to a terminal on the basis of downlink control information (DCI). DCI is defined according to various formats, and the DCI represents, according to each format, whether scheduling information is for uplink data (UL grant) or scheduling information is for downlink data (DL grant), whether the DCI is compact DCI having a small size of control information, whether spatial multiplexing using multiple antennas is applied, whether the DCI is for controlling power, and the like. The terminal may monitor a DCI format for fallback and a DCI format for non-fallback with respect to a physical uplink shared channel (PUSCH) or a physical downlink shared channel (PDSCH). The fallback DCI format may include a fixed field predefined between the base station and the terminal, and the non-fallback DCI format may include a configurable field.

An example of a DCI format will be described below.

DCI format 0_0 may be used as fallback DCI for scheduling of a PUSCH, wherein a CRC is scrambled with a C-RNTI. DCI format 0_0 in which the CRC is scrambled with the C-RNTI may include, for example, the following information.

TABLE 3

Identifier for DCI formats - [1] bit
Frequency domain resource
assignment - $\lceil \log_2(N_{RB}^{UL, BWP}(N_{RB}^{UL, BWP} + 1)/2) \rceil$ bits
Time domain resource assignment - 4 bits
Frequency hopping flag - 1 bit
Modulation and coding scheme - 5 bits
New data indicator - 1 bit
Redundancy version - 2 bits
HARQ process number - 4 bits
Transmit power control (TPC) command for scheduled PUSCH - [2] bits
- Uplink (UL)/supplementary UL (SUL) indicator - 0 or 1 bit DCI format 0_1 may be used as non-fallback DCI for scheduling of a PUSCH, wherein a CRC is scrambled with a C-RNTI. DCI format 0_1 in which the CRC is scrambled with the C-RNTI may include, for example, the following information.

TABLE 4

Carrier indicator - 0 or 3 bits
UL/SUL indicator - 0 or 1 bit
Identifier for DCI formats - [1] bits
Bandwidth part indicator - 0, 1 or 2 bits
Frequency domain resource assignment
For resource allocation type 0, $\lceil N_{RB}^{UL,BWP}/P \rceil$ bits
For resource allocation type 1, $\lceil \log_2(N_{RB}^{UL,BWP}(N_{RB}^{UL,BWP}+1)/2 \rceil$ bits
Time domain resource assignment - 1, 2, 3, or 4 bits
Virtual resource block (VRB)-to-physical resource block (PRB) mapping - 0 or 1 bit, only for resource allocation type 1.
0 bit if only resource allocation type 0 is configured;
1 bit otherwise.
Frequency hopping flag - 0 or 1 bit, only for resource allocation type 1.
0 bit if only resource allocation type 0 is configured;
1 bit otherwise.
Modulation and coding scheme - 5 bits
New data indicator - 1 bit
Redundancy version - 2 bits
HARQ process number - 4 bits
1st downlink assignment index - 1 or 2 bits
1 bit for semi-static HARQ-ACK codebook;
2 bits for dynamic HARQ-ACK codebook with single HARQ-ACK codebook (when a single HARQ-ACK codebook and a dynamic HARQ-ACK codebook are used together).
2nd downlink assignment index - 0 or 2 bits
2 bits for dynamic HARQ-ACK codebook with two HARQ-ACK sub-codebooks (when two HARQ-ACK sub-codebooks and a dynamic HARQ-ACK codebook are used together);
0 bit otherwise.
TPC command for scheduled PUSCH - 2 bits SRS resource indicator - $\left\lceil \log_2\left(\sum_{k=1}^{L_{max}} \binom{N_{SRS}}{k}\right)\right\rceil$ or $\lceil \log_2(N_{SRS}) \rceil$ bits $\left\lceil \log_2\left(\sum_{k=1}^{L_{max}} \binom{N_{SRS}}{k}\right)\right\rceil$ bits for non-codebook based PUSCH transmission;

$\lceil \log_2(N_{SRS}) \rceil$ bits for codebook based PUSCH transmission.
Precoding information and number of layers - up to 6 bits
Antenna ports - up to 5 bits
SRS request - 2 bits
Channel state information (CSI) request - 0, 1, 2, 3, 4, 5, or 6 bits
Codeblock group (CBG) transmission - 0, 2, 4, 6, or 8 bits
Phase tracking reference signal-demodulation reference signal relationship (PTRS-DMRS) association - 0 or 2 bits.
beta_offset indicator - 0 or 2 bits
- Demodulation reference signal (DMRS) sequence initialization - 0 or 1 bit DCI format 1_0 may be used as fallback DCI for scheduling of a PDSCH, wherein a CRC is scrambled with a C-RNTI. DCI format 0_1 in which the CRC is scrambled with the C-RNTI may include, for example, the following information.

TABLE 5

Identifier for DCI formats - [1] bit
Frequency domain resource
assignment - $\lceil \log_2(N_{RB}^{DL, BWP}(N_{RB}^{DL, BWP} + 1)/2) \rceil$ bits
Time domain resource assignment - 4 bits
VRB-to-PRB mapping - 1 bit
Modulation and coding scheme - 5 bits
New data indicator - 1 bit
Redundancy version - 2 bits
HARQ process number - 4 bits
Downlink assignment index - 2 bits
TPC command for scheduled PUCCH - [2] bits
Physical uplink control channel (PUCCH) resource indicator - 3 bits
- PDSCH-to-HARQ feedback timing indicator - [3] bits DCI format 1_1 may be used as non-fallback DCI for scheduling of a PUSCH, wherein a CRC is scrambled with a C-RNTI. DCI format 1_1 in which the CRC is scrambled with the C-RNTI may include, for example, the following information.

TABLE 6

Carrier indicator - 0 or 3 bits
Identifier for DCI formats - [1] bits
Bandwidth part indicator - 0, 1 or 2 bits
Frequency domain resource assignment
For resource allocation type 0, $\lceil N_{RB}^{DL, BWP}/P \rceil$ bits
For resource allocation type 1,
$\lceil \log_2(N_{RB}^{DL, BWP}(N_{RB}^{DL, BWP} + 1)/2) \rceil$ bits
Time domain resource assignment - 1, 2, 3, or 4 bits
VRB-to-PRB mapping - 0 or 1 bit, only for resource allocation type 1.
0 bit if only resource allocation type 0 is configured;
1 bit otherwise.
Physical resource block (PRB) bundling size indicator - 0 or 1 bit
Rate matching indicator - 0, 1, or 2 bits
Zero-power (ZP) channel state information reference signal (CSI-RS) trigger - 0, 1, or 2 bits
For transport block 1:
Modulation and coding scheme - 5 bits
New data indicator - 1 bit
Redundancy version - 2 bits
For transport block 2:
Modulation and coding scheme - 5 bits
New data indicator - 1 bit
Redundancy version - 2 bits
HARQ process number - 4 bits
Downlink assignment index - 0 or 2 or 4 bits
TPC command for scheduled PUCCH - 2 bits
PUCCH resource indicator - 3 bits
PDSCH-to-HARQ_feedback timing indicator - 3 bits
Antenna ports - 4, 5 or 6 bits
Transmission configuration indication (TCI) - 0 or 3 bits
SRS request - 2 bits
CBG transmission information - 0, 2, 4, 6, or 8 bits
Codeblock group (CBG) flushing out information - 0 or 1 bit
- DMRS sequence initialization - 1 bit Fields of DCI format 1_1 may have the following meanings.

Carrier indicator: Indicating a frequency carrier on which transmission is performed.

DCI format indicator: An indicator that discriminates whether corresponding DCI is for a downlink or an uplink.

Bandwidth part (hereinafter, BWP) indicator: Indicating a BWP in which transmission is performed.

Frequency domain resource assignment: Indicating an RB of a frequency domain, which is allocated for data transmission. A resource to be represented is determined according to a system bandwidth and a resource allocation scheme.

Time domain resource assignment: Indicating an OFDM symbol of a slot in which a data-related channel is to be transmitted.

VRB-to-PRB mapping: Indicating a scheme by which a virtual RB (hereinafter, VRB) index and a physical RB (hereinafter, PRB) index are to be mapped.

Modulation and coding scheme (MCS): Indicating a coding rate and a modulation scheme used for data transmission. That is, a coding rate value that can inform a transport block size (TBS) and channel coding information, in addition to information indicating whether a modulation scheme is quadrature phase shift keying (QPSK), quadrature amplitude modulation (16 QAM), 64 QAM, or 256 QAM, may be indicated.

Codeblock group (CBG) transmission information: Indicating information on a CBG that is to be transmitted, when CBG retransmission is configured.

HARQ process number: Indicating a process number of HARQ.

New data indicator: Indicating whether transmission is HARQ initial transmission or retransmission.

Redundancy version: Indicating a redundancy version of HARQ.

Transmission power control (TPC) command for a physical uplink control channel (PUCCH): Indicating a transmission power control command for a PUCCH that is an uplink control channel.

DCI format 0_0 and DCI format 1_0 described above and DCI format 2_2 and DCI format 2_3 to be described below have the same size (A) of a DCI message payload. Each of DCI format 2_0 and DCI format 2_1 to be described below and DCI format 0_1 and DCI format 1_1 may have a DCI message payload size configured differently by the base station. That is, when a size of a DCI message payload of DCI format 0_1 is referred to as B, a size of a DCI message payload of DCI format 1_1 is referred to as C, a size of a DCI message payload of DCI format 2_0 is referred to as D, and a size of a DCI message payload of DCI format 2_1 is referred to as E, all A, B, C, D, and E may be configured differently. Accordingly, the terminal may monitor DCI formats by assuming sizes A, B, C, D, and E of up to five different DCI message payloads.

The DCI may be transmitted on a physical downlink control channel (PDCCH) via channel coding and modulation. A cyclic redundancy check (CRC) is attached to a DCI message payload, and the CRC is scrambled with a radio network temporary identifier (RNTI) corresponding to the identity of the terminal. Different RNTIs are used according to the purpose of the DCI message, for example, terminal (UE)-specific data transmission, a power control command, or a random-access response. That is, the RNTI is not explicitly transmitted, but is included in CRC calculation and transmitted. When the DCI message transmitted on the PDCCH is received, the terminal checks the CRC by using an allocated RNTI, and if a CRC check result is correct, the terminal may know that the message has been transmitted to the terminal.

For example, DCI for scheduling of a PDSCH for system information (SI) may be scrambled with an SI-RNTI. DCI for scheduling of a PDSCH for a random-access response (RAR) message may be scrambled with an RA-RNTI. DCI for scheduling of a PDSCH for a paging message may be scrambled with a P-RNTI. DCI for notification of a slot format indicator (SFI) may be scrambled with an SFI-RNTI. DCI for notification of a transmit power control (TPC) may be scrambled with a TPC-RNTI. DCI for scheduling of a UE-specific PDSCH or PUSCH may be scrambled with a cell RNTI (C-RNTI).

Downlink data may be transmitted on a PDSCH that is a physical channel for downlink data transmission. The PDSCH may be transmitted after a control channel transmission interval, and scheduling information, such as a modulation scheme and a specific mapping position in the frequency domain, is determined based on DCI transmitted via the PDCCH.

Via MCS in control information constituting the DCI, the base station notifies the terminal of a modulation scheme applied to the PDSCH to be transmitted and the size of data to be transmitted (transport block size (TBS)). The MCS may include 5 bits or may include more or fewer than 5 bits. The TBS corresponds to a size of a transport block before channel coding for error correction is applied to data (transport block (TB)) to be transmitted by the base station.

In the disclosure, a transport block (TB) may include a MAC header, a MAC CE, one or more MAC service data units (SDUs), and padding bits. Alternatively, the TB may represent a MAC protocol data unit (PDU) or a data unit for transmission from a MAC layer to a physical layer.

Modulation schemes supported by the 5G or NR system are quadrature phase shift keying (QPSK), 16 quadrature amplitude modulation (QAM), 64 QAM, and 256 QAM, and modulation orders ($Q_m$) correspond to 2, 4, 6, and 8, respectively. That is, 2 bits per symbol may be transmitted in the case of QPSK modulation, 4 bits per OFDM symbol may be transmitted in the case of 16 QAM modulation, 6 bits per symbol may be transmitted in the case of 64 QAM modulation, and 8 bits per symbol may be transmitted in the case of 256 QAM modulation.

In the case of PUSCH transmission, that is uplink data transmission, time domain resource assignment may be transferred according to information on a slot in which the PUSCH is transmitted, and starting OFDM symbol position S in the slot and the number L of OFDM symbols to which the PUSCH is mapped. The aforementioned S may be a relative position from starting of the slot, L may be the number of consecutive OFDM symbols, and S and L may be determined based on a start and length indicator value (SLIV) defined as follows.

If $(L-1) \leq 7$ then $SLIV = 14 \cdot (L-1) + S$ else $SLIV = 14 \cdot (14-L+1) + (14-1-S)$ where $0 < L \leq 14-S$       Equation 1

In the 5G or NR system, a table including, in one row, a SLIV value, a PUSCH mapping type, and information on a slot in which a PUSCH is transmitted may be configured for a terminal generally via an RRC configuration. Subsequently, in time domain resource assignment of DCI, a base station may transfer, to the terminal, an SLIV value, a PUSCH mapping type, and information on a slot in which a PUSCH is transmitted, by indicating an index value in the configured table.

In the 5G or NR systems, type A and type B are defined as PUSCH mapping types. In PUSCH mapping type A, a first OFDM symbol of DMRS OFDM symbols is located in a second or third OFDM symbol of the slot. In PUSCH mapping type B, the first OFDM symbol of DMRS OFDM symbols is located in a first OFDM symbol in a time domain resource assigned for PUSCH transmission. The aforementioned method for PUSCH time domain resource assignment may be equally applicable to PDSCH time domain resource assignment.

When a PDSCH or PUSCH is scheduled for the terminal by DCI, if time resource assignment field index m included in the DCI is indicated, index m informs of a combination of DRMS type A position information, PDSCH mapping type information, slot index $K_0$, data resource start symbol S, and data resource allocation length L, which correspond to m+1 in the table showing time domain resource assignment information. For example, Table 7 is a table that includes time domain resource assignment information.

TABLE 7

| Row index | dmrs-TypeA-Position | PDSCH mapping type | $K_0$ | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

In Table 7, dmrs-typeA-Position is a field indicating a symbol position at which a DMRS is transmitted within one slot indicated by a system information block (SIB) that is a piece of terminal common control information. A possible value for the field is 2 or 3. When the total number of symbols constituting one slot is 14 and a first symbol index is 0, 2 refers to a third symbol and 3 refers to a 4th symbol. In Table 7, the PDSCH mapping type is information indicating a position of a DMRS in a scheduled data resource area. If the PDSCH mapping type is A, a DMRS is always transmitted or received at a symbol position determined by dmrs-typeA-Position regardless of the allocated data time domain resource. If the PDSCH mapping type is B, a position of the DMRS for transmission or reception is always a first symbol of the assigned data time domain resource. In other words, PDSCH mapping type B does not use dmrs-typeA-Position information. In Table 7, $K_0$ refers to an offset of a slot index to which a PDCCH, on which DCI is transmitted, belongs and a slot index, to which a PUSCH or PDSCH scheduled via the DCI belongs. For example, if a slot index of the PDCCH is n, a slot index of the PUSCH or PDSCH scheduled via DCI of the PDCCH is n+$K_0$.

In Table 7, S refers to a start symbol index of a data time domain resource within one slot. The range of a possible S value is 0 to 13, based on a normal cyclic prefix. In Table 7, L refers to a data time domain resource interval length within one slot. The range of a possible L value is 1 to 14. However, the possible values of S and L are determined by Equation 1 and Table 8 or Table 9. Table 7 may indicate values used as default by the terminal before receiving time resource allocation information via UE-specific or UE common higher signaling. As an example, DCI format 0_0 or 1_0 may always use Table 7 for default time resource area values.

Table 7 shows PDSCH time domain resource assignment values, and a K1 value is used instead of a K2 value for PUSCH time domain resource assignment. Table 8 below is an example of a PDSCH time domain resource assignment table.

TABLE 8

| Row index | PUSCH mapping type | $K_2$ | S | L |
|---|---|---|---|---|
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | j | 4 | 10 |
| 6 | Type B | j | 4 | 8 |
| 7 | Type B | j | 4 | 6 |
| 8 | Type A | j + 1 | 0 | 14 |
| 9 | Type A | j + 1 | 0 | 12 |
| 10 | Type A | j + 1 | 0 | 10 |
| 11 | Type A | j + 2 | 0 | 14 |
| 12 | Type A | j + 2 | 0 | 12 |
| 13 | Type A | j + 2 | 0 | 10 |
| 14 | Type B | j | 8 | 6 |
| 15 | Type A | j + 3 | 0 | 14 |
| 16 | Type A | j + 3 | 0 | 10 |

Table 9 below is a table showing possible combinations of S and L according to whether a cyclic prefix is a normal or an extended cyclic prefix, and whether a PDSCH mapping type is type A or type B.

TABLE 9

| PDSCH mapping type | Normal cyclic prefix | | | Extended cyclic prefix | | |
|---|---|---|---|---|---|---|
| | S | L | S + L | S | L | S + L |
| Type A | {0, 1, 2, 3} (Note 1) | {3, . . . , 14} | {3, . . . , 14} | {0, 1, 2, 3} (Note 1) | {3, . . . , 12} | {3, . . . , 12} |
| Type B | {0, . . . , 12} | {2, 4, 7} | {2, . . . , 14} | {0, . . . , 10} | {2, 4, 6} | {2, . . . , 12} |

(Note 1):
S = 3 is applicable only if dmrs-TypeA-Position = 3

Table 10 below is a table showing possible combinations of S and L according to whether a cyclic prefix is a normal or an extended cyclic prefix, and whether a PUSCH mapping type is type A or type B.

TABLE 10

| PUSCH mapping | Normal cyclic prefix | | | Extended cyclic prefix | | |
|---|---|---|---|---|---|---|
| type | S | L | S + L | S | L | S + L |
| Type A | 0 | {4, ..., 14} | {4, ..., 14} | 0 | {4, ..., 12} | {4, ..., 12} |
| Type B | {0, ..., 13} | {1, ..., 14} | {1, ..., 14} | {0, ..., 11} | {1, ..., 12} | {1, ..., 12} |

In Tables 7 and 8, each index may be configurable via a higher signaling parameter of PDSCH-TimeDomainResourceAllocationList or PUSCH-TimeDomainResourceAllocationList.

PDSCH-TimeDomainResourceAllocationList includes one or more higher signaling parameters of PDSCH-TimeDomainResourceAllocation, and k0, mappingtype, and startSymbolAndLength exist in PDSCH-TimeDomainResourceAllocation. The range of a possible value of k0 is 0 to 32. Mappingtype may correspond to type A or type B. The range of a possible value of StartSymbolAndLength is 0 to 127. As described above, if mappingtype is type A, a symbol position of a DMRS follows a value indicated by dmrs-typeA-Position.

PUSCH-TimeDomainResourceAllocationList includes one or more higher signaling parameters of PUSCH-TimeDomainResourceAllocation, and k0, mapping type, and startSymbolAndLength exist in PUSCH-TimeDomainResourceAllocation. The range of a possible value of k0 is 0 to 32. Mappingtype may correspond to type A or type B. The range of a possible value of StartSymbolAndLength is 0 to 127. As described above, if mappingtype is type A, a symbol position of a DMRS follows a value indicated by dmrs-typeA-Position.

Aforementioned PDSCH-TimeDomainResourceAllocation or PUSCH-TimeDomainResource Allocation corresponds to a method of assigning a time domain resource for the PDSCH or PUSCH within one slot. Higher signaling of aggregationFactorDL refers to the number of slots in which a PDSCH-TimeDomainResourceAllocation value applied in one slot is repeatedly transmitted. Higher signaling of aggregationFactorUL refers to the number of slots in which a PUSCH-TimeDomainResourceAllocation value applied in one slot is repeatedly transmitted. The ranges of possible values of aggregationFactorDL and aggregationFactorUL are {1,2,4,8}. For example, if aggregationFactorDL is 8, this indicates that one of possible PDSCH-TimeDomainResourceAllocation values is repeatedly transmitted over a total of 8 slots. However, if at least some of symbols applied to PDSCH-TimeDomainResourceAllocation in a specific slot are uplink symbols, PDSCH transmission or reception in the slot is omitted. Similarly, if at least some of symbols applied to PUSCH-TimeDomainResourceAllocation in a specific slot are downlink symbols, PUSCH transmission or reception in the slot is omitted.

Subsequently, a PUCCH will be described. First, a long PUCCH is described, wherein since a control channel of each long transmission interval is used for the purpose of increasing cell coverage, the long PUCCH may be transmitted in a DFT-S-OFDM scheme, which is short carrier transmission, rather than OFDM transmission. Therefore, in this case, transmission should be performed using only consecutive subcarriers, and frequency hopping configuration may be performed to obtain a frequency diversity effect. That is, if frequency hopping is applied (when frequency hopping is enabled via a higher signal), an uplink control channel of a long transmission interval may be configured with frequency resources located at a distance from each other. If frequency hopping is not applied (when frequency hopping is disabled via a higher signal), the long PUCCH may be transmitted during a transmission symbol interval at a frequency position according to transmission start PRB information and PRB number information configured via the higher signal. In terms of frequency, the distance should be smaller than a bandwidth supported by the terminal. In the front part of the slot, transmission is performed using PRB-1 which is a transmission start PRB configured via higher signal, and in the end part of the slot, when hopping is configured, transmission is performed using PRB-2 which is spaced apart from PRB-1 by a frequency resource for frequency hopping. In the above, a PRB which is a physical resource block refers to a minimum transmission unit on the frequency side, and may be defined to be 12 subcarriers, etc. Therefore, the frequency-side distance between PRB-1 and PRB-2 should be smaller than a maximum supported bandwidth of the terminal, and the maximum supported bandwidth of the terminal may be equal to or smaller than a bandwidth supported by the system.

The long PUCCH supports transmission formats, such as PUCCH format 1, PUCCH format 3, and PUCCH format 4, depending on the number of supportable control information bits and whether terminal multiplexing via Pre-DFT orthogonal cover code (OCC) support in the front stage of IFFT is supported.

First, PUCCH format 1 is a DFT-S-OFDM-based long PUCCH format capable of supporting control information of up to 2 bits. The control information may include each of or a combination of HARQ-ACK and scheduling request (SR). In PUCCH format 1, an OFDM symbol including a demodulation reference signal (DMRS) that is a demodulation reference signal (or reference signal) and an OFDM symbol including control information (uplink control information (UCI)) are configured in a repetitive manner. For example, if the number of transmission symbols of PUCCH format 1 is 8 symbols, from a first start symbol of 8 symbols, DMRS symbol, UCI symbol, DMRS symbol, UCI symbol, DMRS symbol, UCI symbol, DMRS symbol, and UCI symbol are included in sequence. In the DMRS symbol, the terminal spreads a sequence, which corresponds to a length of 1 RB on the frequency axis within one OFDM symbol, to the time axis by using an orthogonal code (or orthogonal sequence or spreading code, $w_{i(m)}$, performs IFFT on the spread sequence, and then performs transmission. In the UCI symbol, the terminal generates d(0) by BPSK-modulating 1-bit control information and QPSK-modulating 2-bit control information, multiplies generated d(0) by a sequence corresponding to a length of 1 RB on the frequency axis so as to perform scrambling, and spreads the scrambled sequence on the time axis by using an orthogonal code (or an orthogonal sequence or spreading code $w_{i(m)}$, performs IFFT on the spread sequence, and then performs transmission. The terminal generates the sequence, based on a group hopping or sequence hopping configuration and a configured ID, which are configured via a higher signal from the base station, and generates a sequence corresponding to a length of 1 RB by cyclic shifting the generated sequence with an initial cyclic shift (CS) value configured via a higher signal.

$w_{i(m)}$ is given as shown in Table 11 below according to a length ($N_{SF}$) of a spreading code. i refers to an index of the spreading code itself, and m refers to indexes of elements of the spreading code. Here, numbers in [ ] in Table 11 refer to φ(m), for example, if the length of the spreading code is 2 and the index of the configured spreading code satisfies i=0, spreading code $w_{i(m)} = e^{j2\pi\varphi(m)/N_{SF}}$ becomes $w_{i(0)} = e^{j2\pi \cdot 0/N_{SF}} = 1$ and $w_{i(1)} = e^{j2\pi \cdot 0/N_{SF}} = 1$ so as to satisfy $w_{i(m)} = [1\ 1]$.

of or a combination of HARQ-ACK, CSI, and SR. A difference between PUCCH format 4 and PUCCH format 3 is that, in a case of PUCCH format 4, PUCCH format 4 of multiple terminals can be multiplexed within one RB. Multiplexing of PUCCH format 4 of multiple terminals is possible via application of Pre-DFT OCC to control information in the front stage of IFFT. However, the number of transmittable control information symbols of one terminal decreases according to the number of multiplexed terminals.

In the following, a short PUCCH will be described. A short PUCCH may be transmitted in both a downlink centric slot and an uplink centric slot, and in general, a short PUCCH may be transmitted at a last symbol of a slot or an OFDM symbol at the end (e.g., a last OFDM symbol, a second from the last OFDM symbol, or last 2 OFDM symbols). Of course, short PUCCH transmission at a random position in the slot is also possible. The short PUCCH

TABLE 11

| $N_{SF}$ | φ(m) | | | | | | |
|---|---|---|---|---|---|---|---|
| | i = 0 | i = 1 | i = 2 | i = 3 | i = 4 | i = 5 | i = 6 |
| 1 | [0] | — | — | — | — | — | — |
| 2 | [0 0] | [0 1] | — | — | — | — | — |
| 3 | [0 0 0] | [0 1 2] | [0 2 1] | — | — | — | — |
| 4 | [0 0 0 0] | [0 2 0 2] | [0 0 2 2] | [0 2 2 0] | — | — | — |
| 5 | [0 0 0 0 0] | [0 1 2 3 4] | [0 2 4 1 3] | [0 3 1 4 2] | [0 4 3 2 1] | — | — |
| 6 | [0 0 0 0 0 0] | [0 1 2 3 4 5] | [0 2 4 0 2 4] | [0 3 0 3 0 3] | [0 4 2 0 4 2] | [0 5 4 3 2 1] | — |
| 7 | [0 0 0 0 0 0 0] | [0 1 2 3 4 5 6] | [0 2 4 6 1 3 5] | [0 3 6 2 5 1 4] | [0 4 1 5 2 6 3] | [0 5 3 1 6 4 2] | [0 6 5 4 3 2 1] |

Next, PUCCH format 3 is a DFT-S-OFDM-based long PUCCH format capable of supporting control information exceeding 2 bits. The control information may include each of or a combination of HARQ-ACK, channel state information (CSI), and SR. In PUCCH Format 3, a DMRS symbol position may be as shown in Table 12 below according to whether frequency hopping is configured and whether an additional DMRS symbol is configured.

TABLE 12

| | DMRS position within PUCCH format 3/4 transmission | | | |
|---|---|---|---|---|
| Transmission | No additional DMRS configured | | Additional DMRS configured | |
| length of PUCCH format 3/4 | No frequency hopping configured | Frequency hopping configured | No frequency hopping configured | Frequency hopping configured |
| 4 | 1 | 0, 2 | 1 | 0, 2 |
| 5 | 0, 3 | | 0, 3 | |
| 6 | 1, 4 | | 1, 4 | |
| 7 | 1, 4 | | 1, 4 | |
| 8 | 1, 5 | | 1, 5 | |
| 9 | 1, 6 | | 1, 6 | |
| 10 | 2, 7 | | 1, 3, 6, 8 | |
| 11 | 2, 7 | | 1, 3, 6, 9 | |
| 12 | 2, 8 | | 1, 4, 7, 10 | |
| 13 | 2, 9 | | 1, 4, 7, 11 | |
| 14 | 3, 10 | | 1, 5, 8, 12 | |

For example, if the number of transmission symbols of PUCCH format 3 is 8 symbols, a first start symbol of the 8 symbols starts with 0, and a DMRS is transmitted in the first symbol and a fifth symbol. The above table is applied in the same way to a DMRS symbol position of PUCCH format 4.

Next, PUCCH format 4 is a DFT-S-OFDM-based long PUCCH format capable of supporting control information exceeding 2 bits. The control information may include each may be transmitted using one OFDM symbol or two OFDM symbols. A radio resource for the short PUCCH is allocated in units of PRBs on the frequency side, wherein one PRB or multiple consecutive PRBs may be allocated, and multiple PRBs separated in a frequency band may be allocated. The allocated PRB should be included in the same or smaller band compared to a frequency band supported by the terminal. In one PRB, uplink control information and a demodulation reference signal need to be multiplexed in a frequency band, wherein a multiplex mapping scheme is defined in the standard, so that the terminal transmits the short PUCCH according to the mapping scheme, and the base station demodulates the short PUCCH according to the mapping scheme. Alternatively, the terminal multiplexes the demodulation reference signal and the uplink control information and transmits the multiplexed signal, according to a method indicated via reception of a higher signal. Alternatively, a method of transmitting a demodulation reference signal may be determined according to the number of bits of the uplink control information. If the number of bits of the uplink control information is large, a lot of resources need to be used for transmission of the uplink control information in order to lower a transmission code rate.

The short PUCCH supports transmission formats, such as PUCCH format 0 and PUCCH format 2, according to the number of supportable control information bits. First, PUCCH format 0 is a CP-OFDM-based short PUCCH format capable of supporting control information of up to 2 bits. The control information may include each of or a combination of HARQ-ACK and SR. PUCCH format 0 has a structure of transmitting no DMRS and transmitting only a sequence mapped to 12 subcarriers in the frequency axis within one OFDM symbol. The terminal generates a sequence, based on a group hopping or sequence hopping configuration and a configured ID, which are configured via a higher signal from the base station, cyclic-shifts the generated sequence by using a final cyclic shift (CS) value obtained by adding a different CS value to an indicated initial CS value depending on ACK or NACK, and maps the cyclic-shifted sequence to 12 subcarriers, so as to perform transmission. For example, in a case where HARQ-ACK is 1 bit, as in the following Table 13, if ACK, the final CS is generated by adding 6 to the initial CS value, and if NACK, the final CS is generated by adding 0 to the initial CS. The CS value of 0 for NACK and the CS value of 6 for ACK are defined in the standard, and the terminal always generates PUCCH format 0 according to the value so as to transmit 1-bit HARQ-ACK.

TABLE 13

| 1-bit HARQ-ACK | NACK | ACK |
|---|---|---|
| Final CS | (Initial CS + 0) mod 12 = Initial CS | (Initial CS + 6) mod 12 |

For example, if HARQ HARQ-ACK is 2 bits, as in the following Table 14, the terminal adds as 0 to the initial CS value if (NACK, NACK), adds 3 to the initial CS value if (NACK, ACK), adds 6 to the initial CS value if (ACK, ACK), and adds 9 to the initial CS value if (ACK, NACK). The CS value of 0 for (NACK, NACK), the CS value of 3 for (NACK, ACK), the CS value of 6 for (ACK, ACK), and the CS value of 9 for (ACK, NACK) are defined in the standard, and the terminal always generates PUCCH format 0 according to the value so as to transmit a 2-bit HARQ-ACK.

If the final CS value exceeds 12 due to the CS value added according to ACK or NACK to the initial CS value, since a sequence length is 12, it would be obvious to apply modulo 12.

TABLE 14

| 2-bit HARQ-ACK | NACK, NACK | NACK, ACK | ACK, ACK | ACK, NACK |
|---|---|---|---|---|
| Final CS | (Initial CS + 0) mod 12 = Initial CS | (Initial CS + 3) mod 12 | (Initial CS + 6) mod 12 | (Initial CS + 9) mod 12 |

Next, PUCCH format 2 is a CP-OFDM-based short PUCCH format capable of supporting control information exceeding 2 bits. The control information may include each of or a combination of HARQ-ACK, CSI, and SR. In PUCCH format 2, positions of subcarriers via which a DMRS is transmitted within one OFDM symbol are fixed to subcarriers having indexes of #1, #4, #7, and #10, when an index of a first subcarrier is #0. The control information is mapped to subcarriers remaining after excluding the subcarriers, in which the DMRS is positioned, via modulation after channel coding.

A method by which the terminal selects one PUCCH format from among the short PUCCH format and the long PUCCH format and transmits control information is as follows.

The terminal is configured with PUCCH resource sets via a higher signal. The terminal selects the configured PUCCH resource sets according to the number of control information bits. In a specific slot, the terminal selects PUCCH resource set 0 when the number of control information bits to be transmitted is 1 to 2, selects PUCCH resource set 1 when the number of control information bits to be transmitted is 3 to $N_2-1$, selects PUCCH resource set 2 when the number of control information bits to be transmitted is from $N_2$ to $N_3-1$, and selects PUCCH resource set 3 when the number of control information bits to be transmitted is from $N_3$ to $N_4-1$. All $N_2$, $N_3$, and $N_4$ may be received in advance by the terminal from the base station via a higher signal.

Each of the PUCCH resource sets includes X PUCCH resources, and the X PUCCH resources include a resource for a short PUCCH (PUCCH format 0 or PUCCH format 2) or a resource for a long PUCCH (PUCCH format 1, PUCCH format 3, or PUCCH format 4). That is, each configured PUCCH resource includes all information necessary to transmit a specific PUCCH format (PUCCH format 0, PUCCH format 1, PUCCH format 2, PUCCH format 3, or PUCCH format 4), and each PUCCH resource may be configured to transmit a different PUCCH format. X is a constant, and X may be configured differently for each PUCCH resource set via a higher signal. That is, X=32 may be satisfied for PUCCH resource set 0, and X=8 may be satisfied for remaining PUCCH resource sets 1, 2, and 3.

A resource is selected by the terminal from among X resources and whether to transmit a PUCCH format corresponding to the selected resource may be indicated via a bit of a downlink control channel, and may be derived via a unique identifier (ID) of the terminal, a slot index, a transmission resource of the downlink control channel, or the like. Alternatively, the above transmission of the PUCCH format may be indicated to the terminal by a combination of the method of deriving the same via a unique identifier (ID) of the terminal, a slot index, a transmission resource of the downlink control channel, or the like and indication of the downlink control channel. The terminal receives or derives the indication method, selects one PUCCH resource from X PUCCH resources, and transmits control information via a corresponding PUCCH format.

The PUCCH resource indication method may be applied only when the terminal is capable of determining a PUCCH resource via reception of a corresponding downlink control channel before HARQ-ACK transmission, as in HARQ-ACK transmission, and if the terminal receives no corresponding downlink control channel before CSI or SR, as in CSI or SR transmission, the terminal receives a PUCCH format and a necessary PUCCH resource required to be used during CSI or SR transmission, in advance from the base station via a higher signal, and the terminal transmits the CSI or SR by using the configured PUCCH format in the configured PUCCH resource in a slot for CSI or SR transmission according to an offset and an interval configured from the base station via the higher signal.

Each PUCCH resource corresponding to the PUCCH format includes at least one piece of the following information.

A PUCCH transmission start symbol and the number of PUCCH transmission symbols

An index indicating a start PRB, the number of transmitted PRBs, whether frequency hopping is configured, and a frequency resource of a second hop when frequency hopping is indicated An initial CS value, an index of time axis orthogonal cover code (OCC), a length of Pre-DFT OCC, and in index of Pre-DFT OCC The ranges of required information and values may be summarized according to each of PUCCH formats as follows in Table 15. In Table 15 below, a case where a value does not need to be configured or a case where the range of a value is not required due to the value being 1 is expressed as N.A.

TABLE 15

| | | PUCCH Format 0 | PUCCH Format 1 | PUCCH Format 2 | PUCCH Format 3 | PUCCH Format 4 |
|---|---|---|---|---|---|---|
| Starting symbol | Configurability | √ | √ | √ | √ | √ |
| | Value range | 0-13 | 0-10 | 0-13 | 0-10 | 0-10 |
| Number of symbols in a slot | Configurability | √ | √ | √ | √ | √ |
| | Value range | 1, 2 | 4-14 | 1, 2 | 4-14 | 4-14 |
| Index for identifying starting PRB | Configurability | √ | √ | √ | √ | √ |
| | Value range | 0-274 | 0-274 | 0-274 | 0-274 | 0-274 |
| Number of PRBs | Configurability | N.A. | N.A. | √ | √ | N.A. |
| | Value range | N.A. (Default is 1) | N.A. (Default is 1) | 1-16 | 1-6, 8-10, 12, 15, 16 | N.A. (Default is 1) |
| Enabling a Frequency Hopping | Configurability | √ | √ | √ | √ | √ |
| | Value range | On/Off (only for 2 symbol) | On/Off | On/Off (only for 2 symbol) | On/Off | On/Off |
| Frequency resource of $2^{nd}$ hop if FH is enabled | Configurability | √ | √ | √ | √ | √ |
| | Value range | 0-274 | 0-274 | 0-274 | 0-274 | 0-274 |
| Index of initial cyclic shift | Configurability | √ | √ | N.A. | N.A. | N.A. |
| | Value range | 0-11 | 0-11 | N.A. | 0-11 | 0-11 |
| Index of time-domain OCC | Configurability | N.A. | √ | N.A. | N.A. | N.A. |
| | Value range | N.A. | 0-6 | N.A. | N.A. | N.A. |
| Length of Pre-DFT OCC | Configurability | N.A. | N.A. | N.A. | N.A. | √ |
| | Value range | N.A. | N.A. | N.A. | N.A. | 2, 4 |
| Index of Pre-DFT OCC | Configurability | N.A. | N.A. | N.A. | N.A. | √ |
| | Value range | N.A. | N.A. | N.A. | N.A. | 0, 1, 2, 3 |

In the disclosure, hereinafter, unless otherwise specifically stated, a short PUCCH refers to PUCCH format 0 or PUCCH format 2, and unless otherwise specifically stated, a long PUCCH refers to PUCCH format 1, PUCCH format 3, or PUCCH format 4. In the disclosure, unless otherwise specifically stated, transmission in PUCCH format X refers to transmission of a specific PUCCH format corresponding to a PUCCH resource, which is obtained via the method of the disclosure, such as indication or deriving from a base station, by using the PUCCH resource.

Hereinafter, a downlink control channel in the 5G communication system will be described in more detail with reference to the drawings.

Figure 2:
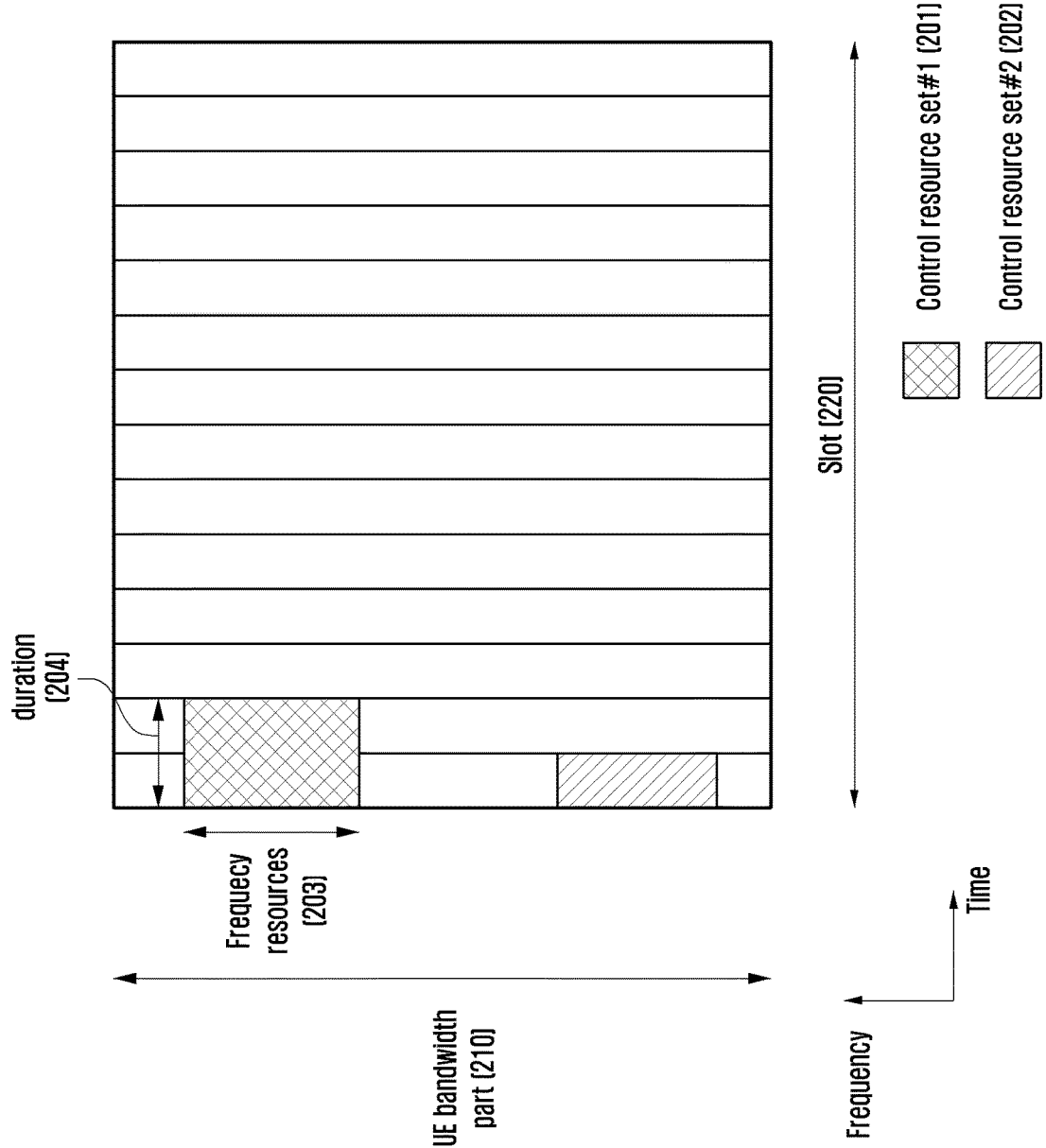
FIG. 2 is a diagram illustrating an example of a control resource set in which a downlink control channel is transmitted in the 5G communication system.

FIG. 2 is a diagram illustrating an example of a control resource set (or CORESET) in which a downlink control channel is transmitted in the 5G wireless communication system. FIG. 2 shows an example in which a bandwidth part 210 of a terminal is configured on the frequency axis, and two control resource sets (control resource set #1 201 and control resource set #2 202) are configured within one slot 220 on the time axis. The control resource sets 201 and 202 may be configured in a specific frequency resource 203 within the entire terminal bandwidth part 210 on the frequency axis. One or multiple OFDM symbols may be configured on the time axis, which may be defined as a control resource set duration 204. In the example of FIG. 2, control resource set #1 201 is configured to be a control resource set duration of 2 symbols, and control resource set #2 202 is configured to be a control resource set duration of 1 symbol.

The control resource set in the 5G system described above may be configured for the terminal by a base station via higher layer signaling (e.g., system information, master information block (MIB), and radio resource control (RRC) signaling). Configuring a control resource set for the terminal may refer to providing information, such as a control resource set identifier (identity), a frequency position of the control resource set, and a symbol length of the control resource set. For example, the following information may be included.

TABLE 16

```
ControlResourceSet ::=           SEQUENCE {
  -- Corresponds to L1 parameter 'CORESET-ID'
  controlResourceSetId           ControlResourceSetId,
    (Control resource set identifier (Identity) )
  frequencyDomainResources       BIT STRING (SIZE (45)),
    (Frequency axis resource assignment information)
  duration                       INTEGER (1..maxCoReSetDuration),
    (Time axis resource assignment information)
  cce-REG-MappingType            CHOICE {
    (CCE-to-REG mapping scheme)
    interleaved                  SEQUENCE {
      reg-BundleSize             ENUMERATED {n2, n3, n6},
        (RGB bundle size)
      precoderGranularity        ENUMERATED {sameAsREG-bundle,
```

TABLE 16-continued

```
    allContiguousRBs},
        interleaverSize          ENUMERATED {n2, n3, n6} (Interleaver size)
        shiftIndex               INTEGER(0..maxNrofPhysicalResourceBlocks-
        1)                       OPTIONAL (Interleaver Shift (Shift) )
        },
    nonInterleaved               NULL
    },
    tci-StatesPDCCH              SEQUENCE(SIZE (1..maxNrofTCI-
        StatesPDCCH)) OF TCI-StateId    OPTIONAL,
        (QCL configuration information)
    tci-PresentInDCI             ENUMERATED
        {enabled}                    OPTIONAL, -- Need S
}
```

In Table 16, tci-StatesPDCCH (hereinafter, this can be used interchangeably with TCI state) configuration information may include information of one or multiple synchronization signal (SS)/physical broadcast channel (PBCH) block indexes or channel state information reference signal (CSI-RS) indexes which are in a quasi-co-located (QCL) relationship with a DMRS transmitted in the corresponding control resource set.

Next, transmission of multiple transmission points (multi-TRP) will be described.

In the Release 15 NR system, PDSCH transmission from a single cell, transmission point, panel, and/or beam (hereinafter, described as transmission reception point (TRP)) or multi-TRP-specific coherent PDSCH transmission is supported, and as an HARQ-ACK transmission method optimized therefor, up to only one PUCCH resource for HARQ-ACK is configured to be transmitted within one slot.

In Release 16, non-coherent joint transmission (NC-JT) is supported for each TRP, wherein each TRP participating in the NC-JT may transmit a separate PDSCH to the terminal at the same time. HARQ-ACK information for the PDSCHs may be transmitted via one PUCCH resource, and in consideration of a case where overhead due to information exchange between TRPs becomes a burden, such as when a backhaul delay time for each TRP is long, a method in which the terminal transmits the HARQ-ACK information via a separate PUCCH resource for each TRP is possible. In particular, when HARQ-ACK information (or UCI information) is transmitted via a separate PUCCH resource for HARQ-ACK transmission for each TRP, the HARQ-ACK information may be time-division multiplexed (TDM) in a slot so as to be transmitted, and if overlap occurs between other PUCCH resources, transmission is performed via one PUCCH, wherein the order of HARQ-ACK information for each TRP is determined in advance, and if there no PDSCH in a specific TRP, the HARQ-ACK information may be exchanged between the terminal and TRPs by a method of substituting NACK.

When different TRP information is mapped to each Coreset via TRP information in a Coreset configuration of the PDCCH, which is configured for the terminal via a higher signal, the terminal may determine that data transmission or reception to or from multi-TRP has been configured for the terminal. Alternatively, by determination, based on the TCI-State field of the PDCCH indicating the QCL relationship, that the terminal is mapped to two or more TCI state values by a higher signal or a combination of higher signals, configuration of data transmission or reception to or from multi-TRP may be determined.

Figure 3:
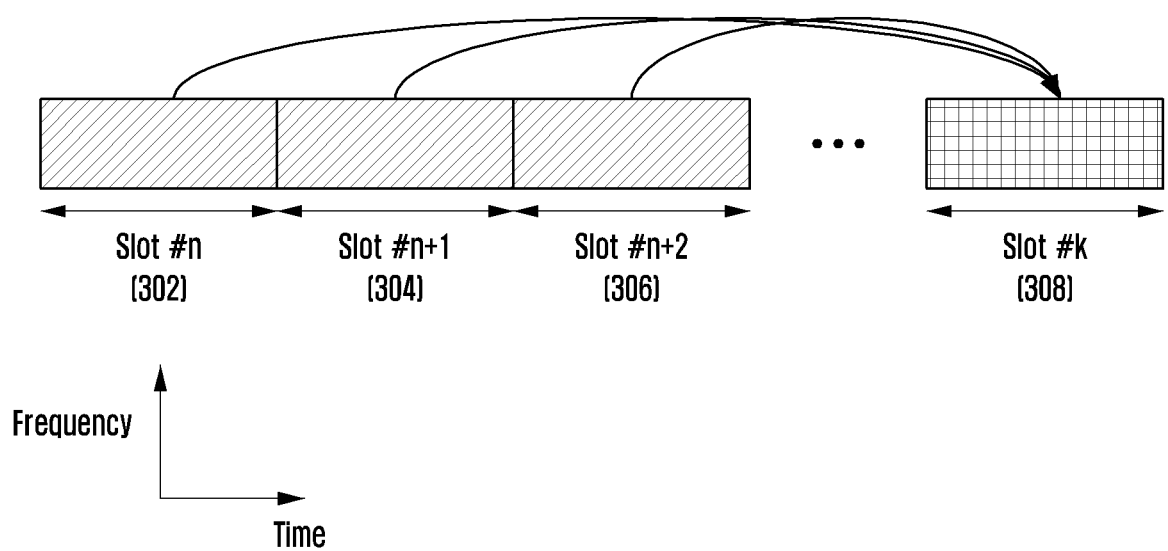
FIG. 3 is a diagram illustrating a semi-static HARQ-ACK codebook configuration method in an NR system.

FIG. 3 is a diagram illustrating a semi-static HARQ-ACK codebook configuration method in an NR system.

In a situation where HARQ-ACK PUCCH, on which the terminal is able to perform transmission within one slot, is limited to one, if the terminal receives a semi-static HARQ-ACK codebook higher configuration, the terminal reports HARQ-ACK information relating to PDSCH reception or SPS PDSCH release (semi-persistent scheduling PDSCH release) in the HARQ-ACK codebook at a slot indicated by a value of a PDSCH-to-HARQ feedback timing indicator in DCI format 1_0 or DCI format 1_1. The terminal reports, as NACK, an HARQ-ACK information bit value in the HARQ-ACK codebook at a slot that is not indicated by a PDSCH-to-HARQ feedback timing indicator field in DCI format 1_0 or DCI format 1_1. If the terminal reports only HARQ-ACK information for one SPS PDSCH release or one PDSCH reception in $M_{A,C}$ cases for candidate PDSCH reception, and when the report is scheduled by DCI format 1_0 including information indicating that a counter downlink assignment index (DAI) field indicates 1 in a PCell, the terminal determines one HARQ-ACK codebook for the SPS PDSCH release or the PDSCH reception.

Otherwise, a method of determining an HARQ-ACK codebook according to the method described below is followed.

If a set of PDSCH reception candidate cases in serving cell c is $M_{A,c}$, $M_{A,c}$ may be obtained via the following [pseudo-code 1] operations.

Start of Pseudo-Code 1
  Operation 1: Initializing j to 0, and $M_{A,c}$ to an empty set. Initializing k, i.e., an HARQ-ACK transmission timing index, to 0.
  Operation 2: Configuring R to a set of each row in a table including slot information, start symbol information, a symbol number, or length information, to which a PDSCH is mapped. If a PDSCH-capable mapping symbol indicated by each value of R is configured as an UL symbol according to DL and UL configurations configured in a higher level, a corresponding row is deleted from R.
  Operation 3-1: The terminal may receive one PDSCH for unicast in one slot, and if R is not an empty set, one is added to set $M_{A,c}$.
  Operation 3-2: If the terminal may receive more than one PDSCH for unicast in one slot, the number of PDSCHs that can be assigned to different symbols in the calculated R is counted, and the corresponding number is added to $M_{A,c}$.
  Operation 4: Starting again from operation 2 by increasing k by 1.
End of Pseudo-Code 1

Taking the above pseudo-code 1 as an example of FIG. 3, in order to perform HARQ-ACK PUCCH transmission in slot #k 308, all slot candidates capable of PDSCH-to- HARQ-ACK timing capable of indicating slot #k 308 are considered. In FIG. 3, it is assumed that HARQ-ACK transmission is possible in slot #k 308 by a combination of PDSCH-to-HARQ-ACK timings at which only PDSCHs scheduled in slot #n 302, slot #n+1 304, and slot #n+2 306 are possible. In addition, the maximum number of PDSCHs that can be scheduled for each slot is derived in consideration of information indicating whether a symbol in a slot is for a downlink or an uplink and time domain resource configuration information of PDSCHs which can be scheduled in slots #n 302, #n+1 304, and #n+2 306, respectively. For example, when the maximum scheduling is possible for two PDSCHs in slot #n 302, three PDSCHs in slot #n+1 304, and two PDSCHs in slot #n+2 306, the maximum number of PDSCHs included in the HARQ-ACK codebook transmitted in slot #k 308 is seven in total. This is referred to as cardinality of the HARQ-ACK codebook.

Figure 4:
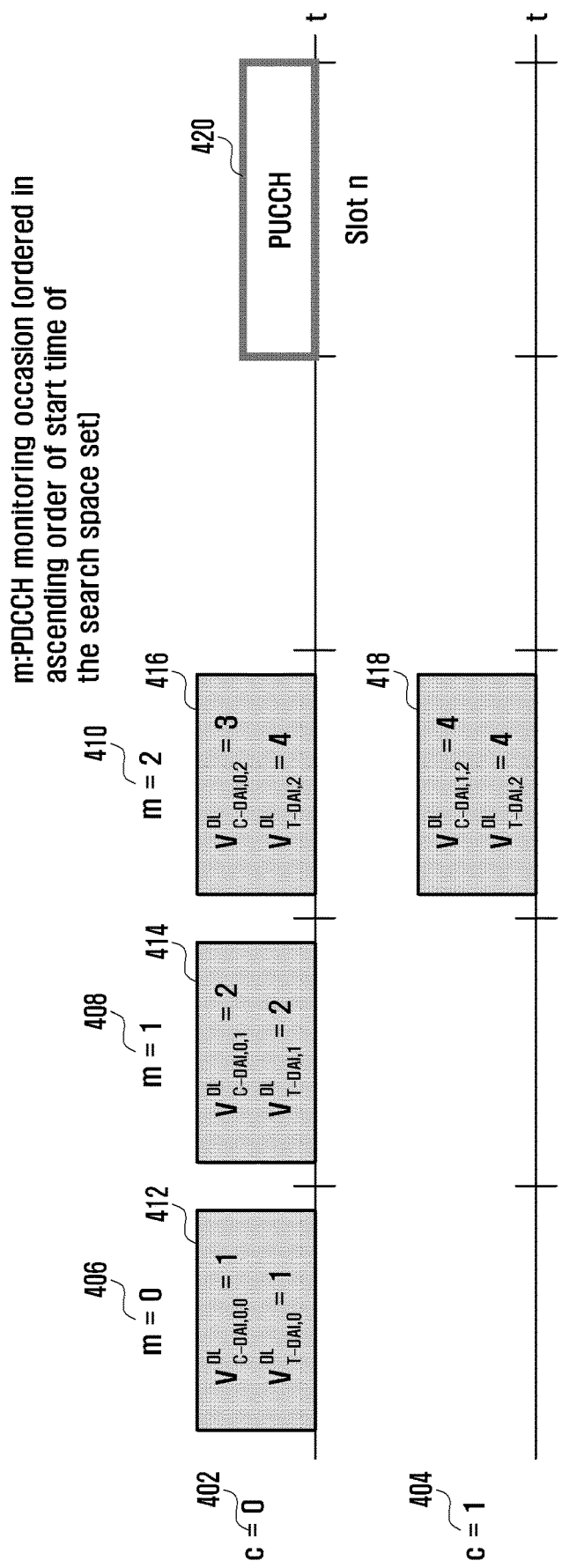
FIG. 4 is a diagram illustrating a dynamic HARQ-ACK codebook configuration method in the NR system.

FIG. 4 is a diagram illustrating a dynamic HARQ-ACK codebook configuration method in the NR system.

Based on a PDSCH-to-HARQ_feedback timing value for PUCCH transmission of HARQ-ACK information in slot n for PDSCH reception or SPS PDSCH release, and K0 that is transmission slot position information of a PDSCH for scheduling in DCI format 1_0 or 1_1, a terminal transmits HARQ-ACK information transmitted within one PUCCH in corresponding slot n. Specifically, for the described HARQ-ACK information transmission, the terminal determines an HARQ-ACK codebook of a PDCCH transmitted in the slot determined by K0 and PDSCH-to-HARQ_feedback timing, based on a DAI included in DCI indicating PDSCH or SPS PDSCH release.

The DAI includes a counter DAI and a total DAI. The counter DAI is information in which the HARQ-ACK information corresponding to the PDSCH scheduled in DCI format 1_0 or DCI format 1_1 indicates a position in the HARQ-ACK codebook. Specifically, a value of the counter DAI in DCI format 1_0 or DCI format 1_1 indicates a cumulative value of PDSCH reception or SPS PDSCH release scheduled by DCI format 1_0 or DCI format 1_1 in specific cell c. The cumulative value is configured based on a PDCCH monitoring occasion and a serving cell in which the scheduled DCI exists.

The total DAI is a value indicating a size of the HARQ-ACK codebook. Specifically, a value of the total DAI refers to the total number of PDSCHs or SPS PDSCH releases, which have been scheduled at a previous time including a point in time at which the DCI has been scheduled. The total DAI is a parameter used when HARQ-ACK information in serving cell c also includes HARQ-ACK information on a PDSCH scheduled in another cell including serving cell c in a carrier aggregation (CA) situation. In other words, there is no total DAI parameter in a system operating with one cell.

FIG. 4 is a diagram illustrating an example of an operation for the DAI. In FIG. 4, when a terminal transmits, on a PUCCH 420, an HARQ-ACK codebook selected based on a DAI in an n-th slot of carrier 0 402 in a situation where two carriers are configured, and this shows a change in values of a total DAI (T-DAI) and a counter DAI (C-DAI) indicated by DCI retrieved for each PDCCH monitoring time point configured for each carrier. First, in DCI retrieved at m=0 406, each of the C-DAI and the T-DAI indicates a value 412 of 1. In DCI retrieved at m=1 408, each of the C-DAI and the T-DAI indicates a value 414 of 2. In DCI retrieved in carrier 0 (c=0) 402 of m=2 410, the C-DAI indicates a value 416 of 3. In DCI retrieved in carrier 1 (c=1) 404 of m=2 410, the C-DAI indicates a value 418 of 4. If carriers 0 and 1 are scheduled at the same PDCCH monitoring time point, all T-DAIs are indicated by 4.

In FIG. 3 and FIG. 4, HARQ-ACK codebook determination is performed in a situation where only one PUCCH including HARQ-ACK information is transmitted in one slot. This is referred to as mode 1. As an example of a method in which one PUCCH transmission resource is determined in one slot, when PDSCHs scheduled in different DCI are multiplexed with one HARQ-ACK codebook and transmitted in the same slot, a PUCCH resource selected for HARQ-ACK transmission is determined as a PUCCH resource indicated by a PUCCH resource indicator field indicated by DCI in which a PDSCH is lastly scheduled. That is, a PUCCH resource indicated by a PUCCH indicator field indicated in DCI scheduled before the DCI is disregarded.

The following description defines HARQ-ACK codebook determination method and devices in a situation where two or more PUCCHs including HARQ-ACK information may be transmitted in one slot. This is referred to as mode 2. A terminal may be able to operate only in mode 1 (only one HARQ-ACK PUCCH is transmitted in one slot) or operate only in mode 2 (one or more HARQ-ACK PUCCHs are transmitted in one slot). Alternatively, for a terminal supporting both mode 1 and mode 2, it may be possible that a base station configures, by a higher signaling, operation in only one mode, or mode 1 and mode 2 are determined implicitly by a DCI format, an RNTI, a DCI specific field value, scrambling, etc. For example, a PDSCH scheduled in DCI format A and HARQ-ACK information associated therewith may be based on mode 1, and a PDSCH scheduled in DCI format B and HARQ-ACK information associated therewith may be based on mode 2.

Next, provided is an embodiment for a terminal to perform PUCCH transmission in multiple slots, such as format determination for repeated PUCCH transmission, a configuration for repeated PUCCH transmission, a method of repeated PUCCH transmission using multiple start positions and intervals in one slot, a method of counting the number of times during repeated PUCCH transmission, and a method of varying the number of counting times depending on capability of the terminal or a base station configuration.

First Embodiment

The first embodiment relates to a method of determining a PUCCH format for repeated PUCCH transmission when the terminal performs repeated PUCCH transmission.

The PUCCH format may be a PUCCH format that supports a duration of 1 to 2 symbols by default, like PUCCH format 0/2. Alternatively, the PUCCH format may be a PUCCH format that supports a duration of 4 to 14 symbols by default, like PUCCH format 1/3/4. Alternatively, the different PUCCH formats for uplink resources having different durations may be repeated (repetition_). The method of determining a PUCCH format according to a duration may be defined in a standard, or may be determined by a base station and transmitted to the terminal via a higher signal. For example, the base station may determine or configure the terminal to use PUCCH format 0/2 for 1 to 2 symbols and to use PUCCH format 1/3/4 for 4 to 14 symbols in order to transmit the same UCI. The PUCCH format may be configured by a higher signal from the base station and the terminal may receive the higher signal, or the terminal may receive a PUCCH format for repeated transmission via a physical layer signal. Alternatively, a PUCCH format for repeated transmission can be defined in the standard.

Figure 5:
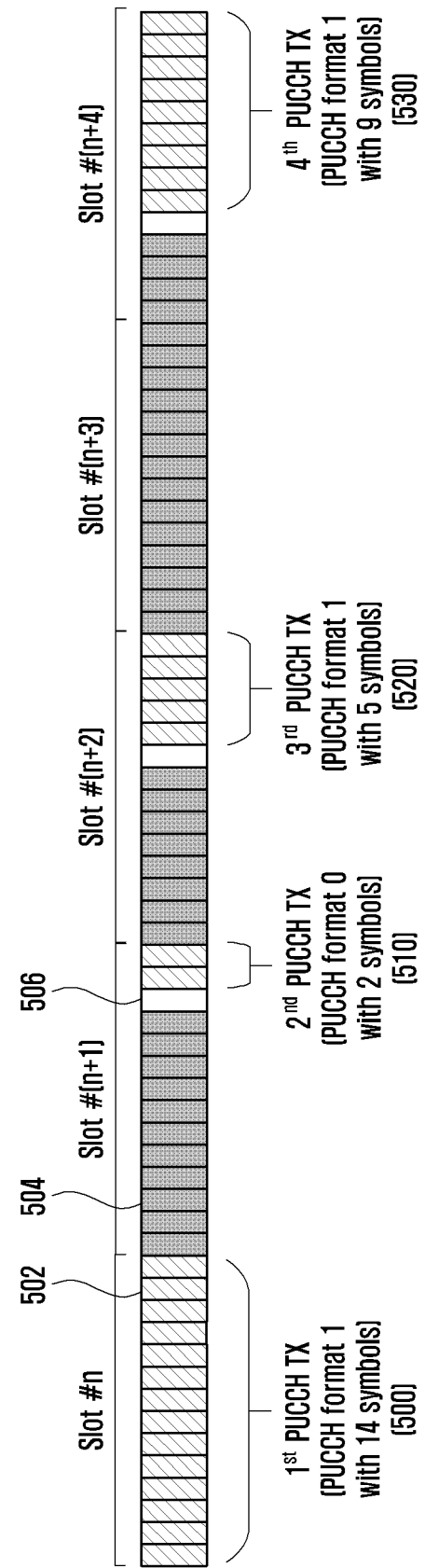
FIG. 5 is a diagram illustrating an example in which PUCCH transmission is repeated based on different PUCCH formats.

FIG. 5 is a diagram illustrating an example in which PUCCH transmission is repeated based on different PUCCH formats. According to FIG. 5, illustrated is an example in which four PUCCH repetitions are configured so that a terminal performs four times of PUCCH repetition to transmit uplink control information of 1 or 2 bits. In FIG. 5, reference numeral 502 indicates an uplink symbol, reference numeral 504 indicates a downlink symbol, and reference numeral 506 indicates a flexible symbol. Although it is assumed in FIG. 5 that a PUCCH format is transmitted using only uplink symbols, PUCCH transmission according to the PUCCH format is also possible in the flexible symbol. Such PUCCH transmission is possible even when, for example, DCI format 2_0 indicates that the flexible symbol is an uplink symbol, or is also possible when the standard defines that a specific uplink channel or signals are transmitted in the flexible symbol.

A PUCCH format for first PUCCH transmission 500 is PUCCH format 1 of 14 symbols, a PUCCH format for second PUCCH transmission 510 is PUCCH format 0 of 2 symbols, a PUCCH format for third PUCCH transmission 520 is PUCCH format 1 of 5 symbols, and a PUCCH format for fourth PUCCH transmission 530 is PUCCH format 1 of 9 symbols. In this way, different PUCCH formats are applicable according to uplink resource lengths.

Second Embodiment

The second embodiment relates to a method of determining a PUCCH transmission resource for repeated PUCCH transmission when the terminal performs repeated PUCCH transmission.

A first method is that a set of multiple start symbols may be configured by the base station. In all start symbols configured in the set, the terminal may perform PUCCH transmission. As an example, the base station may configure {2, 5, 7} as start symbols of a PUCCH, and the terminal may start PUCCH transmission in symbols #2, #5, or #7. If repeated PUCCH transmission is possible in all configured symbols, for example, the terminal may perform PUCCH transmission using an earliest configured symbol as a transmission start symbol.

In a second method, all symbols in which an uplink symbol exists may be used for PUCCH transmission. That is, the terminal may perform PUCCH transmission by using, as a transmission start symbol, a first uplink symbol among one or more consecutive uplink symbols included in a slot. For example, the terminal may perform PUCCH transmission by using, as a transmission start symbol, a first uplink symbol among one or more consecutive uplink symbols configured via an SFI. For example, if there is no SFI configuration, the terminal may determine one or more uplink symbols, based on a higher signal for a time division duplex uplink-downlink configuration (TDD UL-DL configuration). In this case, configuration of a PUCCH transmission start symbol by using a higher signal may be omitted.

A third method is determining, via a higher signal, whether to use the first method or to use the second method, and receiving the signal by the terminal, thereby applying the first or second method.

Figure 6:
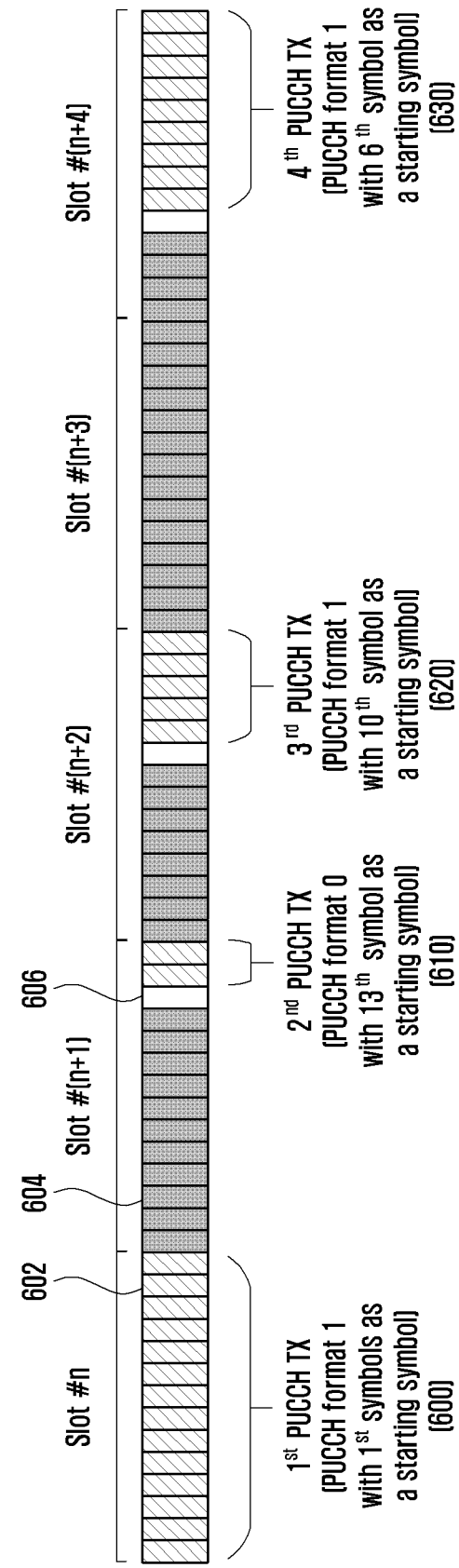
FIG. 6 is a diagram illustrating an example in which PUCCH transmission is repeated, in a method of determining a PUCCH transmission start symbol.

FIG. 6 is a diagram illustrating an example in which PUCCHs according to different PUCCH formats are repeatedly transmitted using the second method in the methods of determining a PUCCH transmission start symbol. According to FIG. 6, illustrated is an example in which four PUCCH repetitions are configured so that a terminal performs four times of PUCCH repetition to transmit uplink control information of 1 or 2 bits. In FIG. 6, reference numeral 602 indicates an uplink symbol, reference numeral 604 indicates a downlink symbol, and reference numeral 606 indicates a flexible symbol. Although it is assumed in FIG. 6 that a PUCCH format is transmitted using only uplink symbols, PUCCH transmission according to the PUCCH format is also possible in the flexible symbol. Such PUCCH transmission is possible even when, for example, DCI format 2_0 indicates that the flexible symbol is an uplink symbol, or is also possible when the standard defines that a specific uplink channel or signals are transmitted in the flexible symbol. In the described cases, the uplink symbol in the PUCCH transmission start symbol determination methods may be understood as an uplink symbol and a flexible symbol.

First PUCCH transmission 600 is PUCCH format 1 in which a transmission start symbol is a first symbol, second PUCCH transmission 610 is PUCCH format 0 in which a transmission start symbol is a 13th symbol, third PUCCH transmission 620 is PUCCH format 1 in which a transmission start symbol is a 10th symbol, and fourth PUCCH transmission 630 is PUCCH format 1 in which a transmission start symbol is a 6th symbol. In this way, during PUCCH repetition, a transmission start symbol of each PUCCH transmission may vary.

In a method of PUCCH transmission/reception, a length (nrofSymbols, the number of symbols, or an interval) of PUCCH transmission may be determined as follows.

A first method is performing repeated PUCCH transmission based on a configuration of a set of possible durations for PUCCH format transmission. For example, the base station may configure {2, 7, 8} as PUCCH lengths (or the number of symbols), and the terminal may perform PUCCH transmission in 2 symbols, 7 symbols, or 8 symbols. If PUCCH transmission of all configured lengths is possible, the terminal may perform PUCCH transmission based on a longest length or a length of a shortest interval.

A second method is using consecutive uplink symbols in a slot including uplink symbols less than a duration configured for PUCCH format transmission. For example, when a transmission interval is configured to {5}, if there are 4 consecutive uplink symbols in a specific slot, the terminal may transmit a PUCCH by using the 4 consecutive uplink symbols. In this case, the number of symbols of the transmitted PUCCH format is 4. When there are 3 consecutive uplink symbols in a specific slot, the terminal may transmit a PUCCH by using the 3 consecutive uplink symbols. In this case, if there is no PUCCH format having a duration of 3, the numbers of symbols in transmitted PUCCH formats are 2 and 1, respectively, wherein a transmission order of a PUCCH format having a duration of 2 and a PUCCH format having a duration of 1 may be configured by the base station so as to be signaled to the terminal or may be determined by a standard. When there are 2 consecutive uplink symbols in a specific slot, the terminal may transmit a PUCCH by using the 2 consecutive uplink symbols. In this case, the number of symbols of the transmitted PUCCH format is 2.

A third method is using one or more consecutive uplink symbols existing in a slot without limitation for PUCCH transmission. The terminal may perform repeated PUCCH transmission regardless of the number of consecutive uplink symbols. In this case, a PUCCH format to be applied may be determined according to the number of consecutive uplink symbols. For example, if the number of consecutive uplink symbols is 2, the terminal may apply 0 or 2 which is a short PUCCH format, and if the number of consecutive uplink symbols is 10, the terminal may perform PUCCH transmission by applying 1, 3, or 4 which is a long PUCCH format.

In the above methods, the minimum number of consecutive uplink symbols capable of PUCCH transmission may be configured by a higher signal. For example, if the minimum number of consecutive uplink symbols is configured to 4, the terminal may perform repeated PUCCH transmission only when there are more than 4 consecutive uplink symbols.

A method to be used from among the above methods may be configured via a higher signal, and the terminal may receive the signal so as to determine the method to be used.

Figure 7:
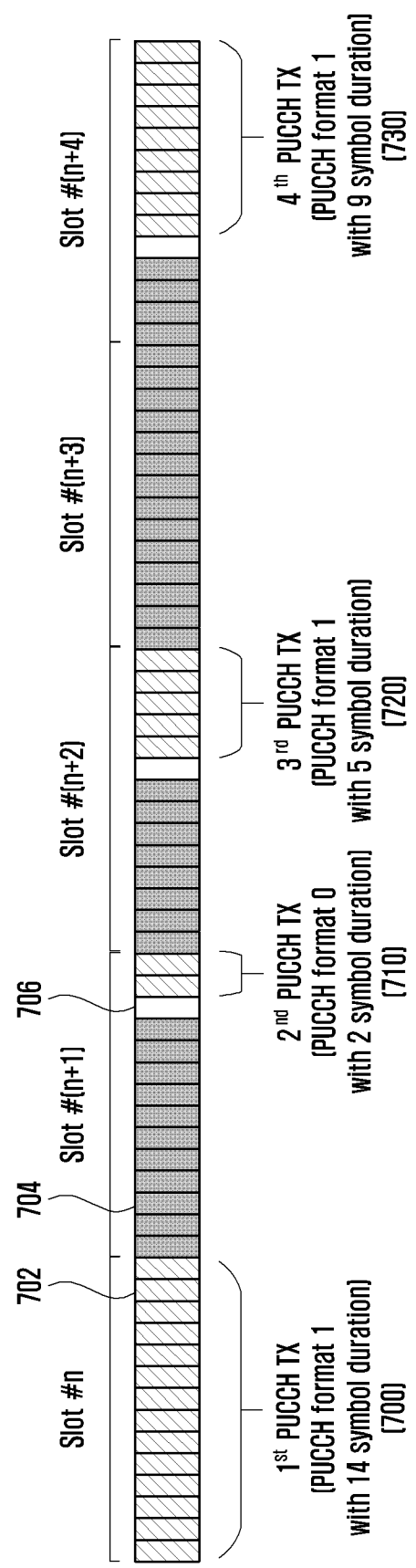
FIG. 7 is a diagram illustrating an example in which PUCCH transmission is repeated, in a method of determining a PUCCH transmission interval.

FIG. 7 is a diagram illustrating an example in which PUCCHs according to different PUCCH formats are repeatedly transmitted using the third method in the methods of determining a PUCCH transmission interval. According to FIG. 7, illustrated is an example in which four PUCCH repetitions are configured so that a terminal performs four times of PUCCH repetition to transmit uplink control information of 1 or 2 bits. In FIG. 7, reference numeral 702 indicates an uplink symbol, reference numeral 704 indicates a downlink symbol, and reference numeral 706 indicates a flexible symbol. Although it is assumed in FIG. 7 that a PUCCH format is transmitted using only uplink symbols, PUCCH transmission according to the PUCCH format is also possible in the flexible symbol. Such PUCCH transmission is possible even when, for example, DCI format 2_0 indicates that the flexible symbol is an uplink symbol, or is also possible when the standard defines that a specific uplink channel or signals are transmitted in the flexible symbol. In the described cases, the uplink symbol in the PUCCH transmission interval determination methods may be understood as an uplink symbol and a flexible symbol.

First PUCCH transmission 700 is PUCCH format 1 with a transmission interval of 14 symbols, second PUCCH transmission 710 is PUCCH format 0 with a transmission interval of 2 symbols, third PUCCH transmission 720 is PUCCH format 1 with a transmission interval of 5 symbols, and fourth PUCCH transmission 730 is PUCCH format 1 having a transmission interval of 9 symbols.

Third Embodiment

The third embodiment relates to a method of, when the terminal performs repeated PUCCH transmission, counting the number of times for repeated PUCCH transmission and stopping repeated PUCCH transmission.

In a method of transmitting/receiving a PUCCH, the number of repeated PUCCH transmissions for stopping of repeated PUCCH transmission may be determined as follows.

A first method is as follows. The base station may transmit the number of symbols for stopping of repeated PUCCH transmission, to the terminal via a higher signal, the terminal may count the number of symbols of the PUCCH formats every time when repeated transmission of the PUCCH format is performed, and the terminal may perform repeated PUCCH transmission if the counted number is less than the number of symbols, which has been transmitted via the higher signal, and may stop repeated PUCCH transmission if the counted number is equal to or greater than the transmitted number of symbols.

A second method is as follows. The base station may transmit the number of slots for stopping of repeated PUCCH transmission, to the terminal via a higher signal, the terminal may count the number of slots of the PUCCH format every time when repeated transmission of the PUCCH format is performed, and the terminal may perform repeated PUCCH transmission if the counted number is less than the number of slots, which has been transmitted via the higher signal, and may stop repeated PUCCH transmission if the counted number is equal to or greater than the transmitted number of slots.

Fourth Embodiment

The fourth embodiment relates to a method of, when the terminal performs repeated PUCCH transmission, considering collision with another channel or signal at the time of counting the number of times for repeated PUCCH transmission.

In counting the number of repeated PUCCH transmissions for stopping of repeated PUCCH transmission, the following methods may be applied when collision with another uplink channel transmission, such as PUSCH repetition, PUCCH transmission, or repeated PUCCH transmission, occurs.

A first method is as follows. When the terminal requires a large number of repeated PUCCH transmissions, that is, when the terminal reports, using a UE capability signal, to the base station that a large number of repeated PUCCH transmissions are required and receives a related higher signal, the terminal may count only the number of repeated PUCCH transmissions which is completed, and may not count a case where repeated PUCCH transmission has failed due to collision with another uplink channel transmission. Via the described method, the terminal can prevent a case in which PUCCH reception fails due to a failure of the base station in reception of a sufficient number of repeated PUCCH transmissions despite a need for a large number of repeated PUCCH transmissions, and can overcome a disadvantage of having to repeat PDSCH transmission again.

A second method is as follows. When the terminal does not require a large number of repeated PUCCH transmissions, that is, when the terminal reports, using a UE capability signal, to the base station that a small number of repeated PUCCH transmissions are required and receives a related higher signal, the terminal may count the number of repeated PUCCH transmissions in both a case where PUCCH transmission is completed and a case where repeated PUCCH transmission has failed due to collision with another uplink channel transmission.

In the above, a case where the terminal requires a large number of repeated PUCCH transmissions is defined as a specific mode (e.g., CE mode B_NR), and if the terminal is defined to be in the specific mode according to the standard, the first method may be applied.

In the above, a case where the terminal requires a small number of repeated PUCCH transmissions is defined as a specific mode (e.g., CE mode A_NR), and if the terminal is defined to be in the specific mode according to the standard, the second method may be applied.

The first to fourth embodiments may operate independently of each other, or two or more embodiments may be organically combined for operation.

Figure 8:
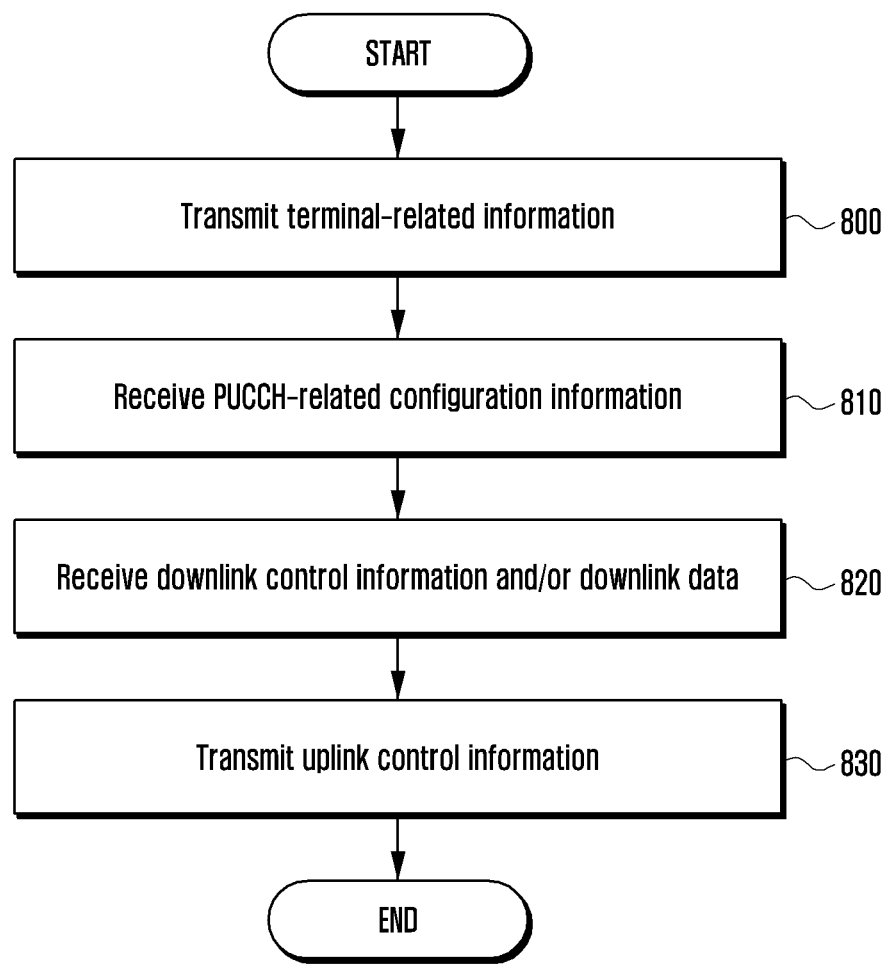
FIG. 8 is a diagram illustrating an operation of a terminal according to embodiments of the disclosure.

FIG. 8 is a diagram illustrating an operation of a terminal according to embodiments of the disclosure.

A terminal may transmit 800 terminal-related information to a base station via a higher signal (e.g., RRC signaling). For example, this information may include information indicating whether the terminal requires a large number of repeated PUCCH transmissions (large number of repetitions) and/or requires a small number of repeated PUCCH transmission (small number of repetition). As another example, the terminal may receive the terminal-related information from the base station. That is, the terminal may receive, from the base station, a configuration for whether the terminal requires a large number of repeated PUCCH transmissions and/or requires a small number of repeated PUCCH transmissions. The configuration may be transmitted after the terminal performs initial access and random access. For example, the configuration may be determined based on the terminal-related information transmitted by the terminal.

The terminal may receive 810 PUCCH-related information from the base station. For example, the information may be information enabling the terminal to transmit (PUCCH repetition) the same uplink control information (UCI) by using multiple resources including one or more slots or one or more OFDM symbols. For example, the information may include information necessary for downlink data scheduling or information necessary for the terminal to transmit channel information. The information may be transmitted to the terminal via a higher signal or a physical signal. For example, the necessary information may include at least one piece of information in the following.

A PUCCH format for performing PUCCH repetition
    A set of multiple starting symbols for performing PUCCH repetition
    A duration (number of symbols) of a PUCCH format during PUCCH repetition
    A minimum duration of a PUCCH format during PUCCH repetition
    The total number of slots, the total number of transmission occasions, or the total number of OFDM symbols for termination of PUCCH repetition
    A configuration of whether to count PUCCH transmission which has failed due to collision with another PUCCH repetition or another PUCCH transmission The terminal may receive downlink control information for scheduling of downlink data from the base station and may receive the downlink data according to the downlink control information, in 820.

The terminal may transmit 830 uplink control information to the base station according to embodiments of the disclosure. The information may be transmitted via a PUCCH. For example, the uplink control information may be transmitted to the base station via a PUCCH repetition method. The uplink control information may include channel information and/or ACK/NACK feedback information for downlink data. (If the terminal periodically transmits channel state information, operation 820 may be omitted. In other words, the terminal may transmit uplink control information irrespective of operation 820.) In this case, a combination of at least one of the first to fourth embodiments may be executed to perform operation 830.

Figure 9:
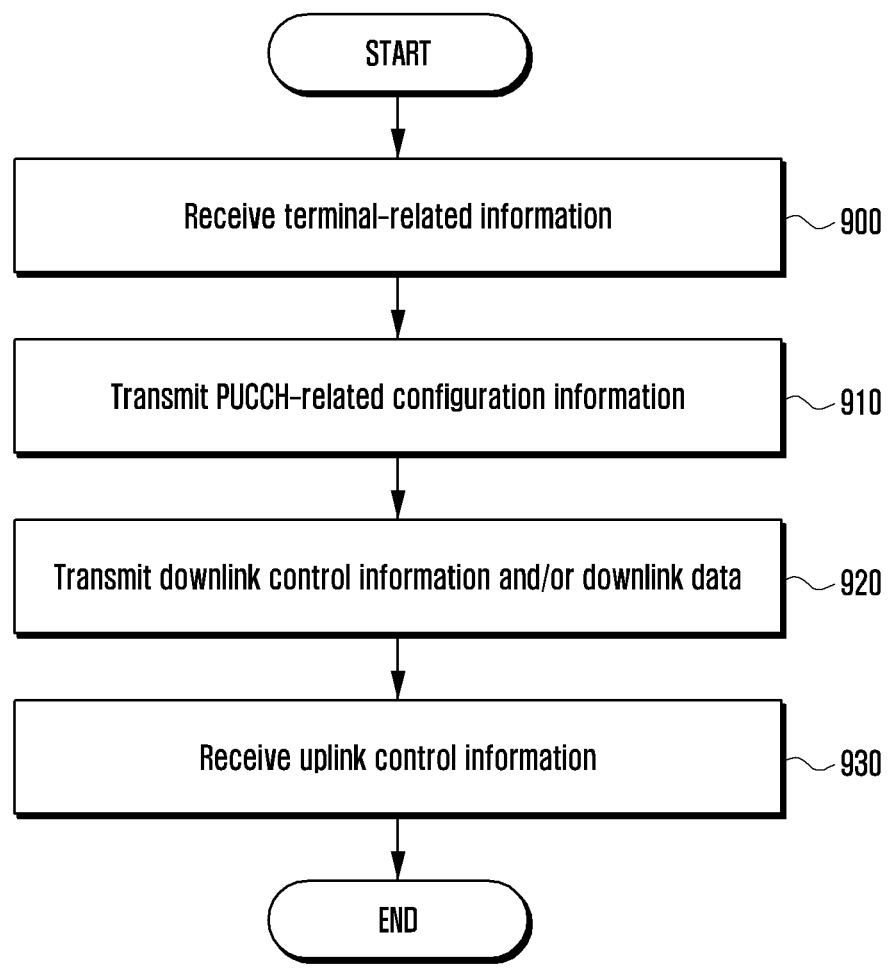
FIG. 9 is a diagram illustrating an operation of a base station according to embodiments of the disclosure.

FIG. 9 is a diagram illustrating an operation of a base station according to embodiments of the disclosure.

A base station may receive 900 terminal-related information from a terminal via a higher signal (e.g., RRC signaling). For example, this information may include information indicating whether the terminal requires a large number of repeated PUCCH transmissions and/or requires a small number of repeated PUCCH transmission. As another example, the base station may transmit the terminal-related information to the terminal. That is, the base station may transmit, to the terminal, a configuration for whether the terminal requires a large number of repeated PUCCH transmissions and/or requires a small number of repeated PUCCH transmissions. The configuration may be transmitted after the terminal performs initial access and random access. For example, the configuration may be determined based on the terminal-related information transmitted by the terminal.

The base station may transmit 910 PUCCH-related information to the terminal. For example, the information may be information enabling the terminal to transmit (PUCCH repetition) the same UCI by using multiple resources including one or more slots or one or more OFDM symbols. For example, the information may include information necessary for downlink data scheduling or information necessary for the terminal to transmit channel information. The information may be transmitted to the terminal via a higher signal or a physical signal. For example, the necessary information may include at least one piece of information in the following.

A PUCCH format for performing PUCCH repetition
    A set of multiple starting symbols for performing PUCCH repetition
    A duration (number of symbols) of a PUCCH format during PUCCH repetition
    A minimum duration of a PUCCH format during PUCCH repetition
    The total number of slots, the total number of transmission occasions, or the total number of OFDM symbols for termination of PUCCH repetition
    A configuration of whether to count PUCCH transmission which has failed due to collision with another PUCCH repetition or another PUCCH transmission The base station may transmit downlink control information for scheduling of downlink data to the terminal and may transmit the downlink data, in 920.

The base station may receive 930 uplink control information according to embodiments of the disclosure. The information may be received via a PUCCH. For example, the uplink control information may be received from the terminal via a PUCCH repetition method. The uplink control information may include channel information and/or ACK/NACK feedback information for downlink data. (If the base station periodically receives information on a channel situation, operation 920 may be omitted. In other words, the base station may receive uplink control information irrespective of operation 920.) In this case, a combination of at least one of the first to fourth embodiments may be executed to perform operation 930.

Figure 10:
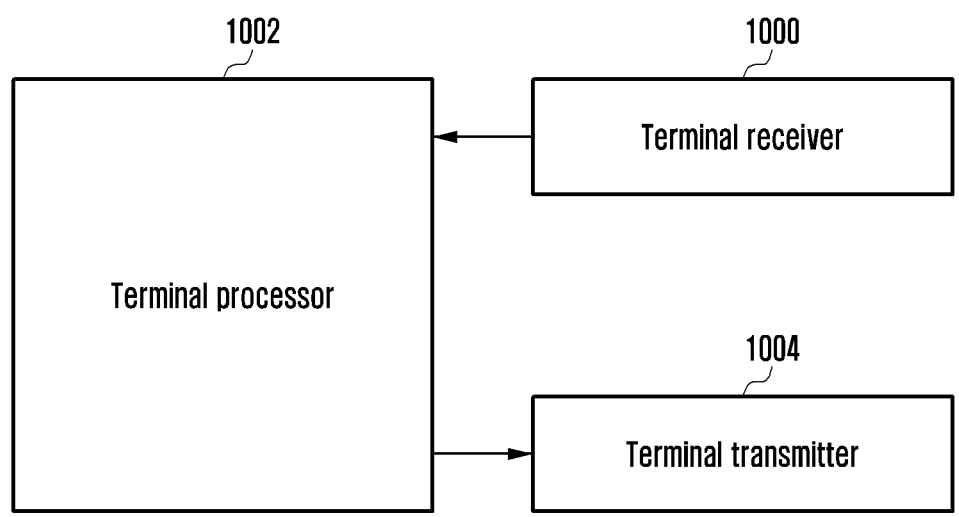
FIG. 10 is a block diagram illustrating a structure of a terminal according to embodiments.

FIG. 10 is a block diagram illustrating a structure of a terminal according to embodiments of the disclosure.

Referring to FIG. 10, a terminal of the disclosure may include a terminal receiver 1000, a terminal transmitter 1004, and a terminal processor 1002. A terminal receiver 1000 and a terminal transmitter 1004 may collectively be referred to as a transceiver. The transceiver may transmit a signal to or receive a signal from a base station. The signal may include control information and data. To this end, the transceiver may include an RF transmitter configured to perform up-conversion and amplification of a frequency of a transmitted signal, an RF receiver configured to perform low-noise amplification of a received signal and down-conversion of a frequency, and the like. In addition, the transceiver may receive a signal via a radio channel and output the signal to the terminal processor 1002, and may transmit, via the radio channel, the signal output from the terminal processor 1002. The terminal processor 1002 may control a series of procedures so that the terminal may operate according to the above-described embodiments.

Figure 11:
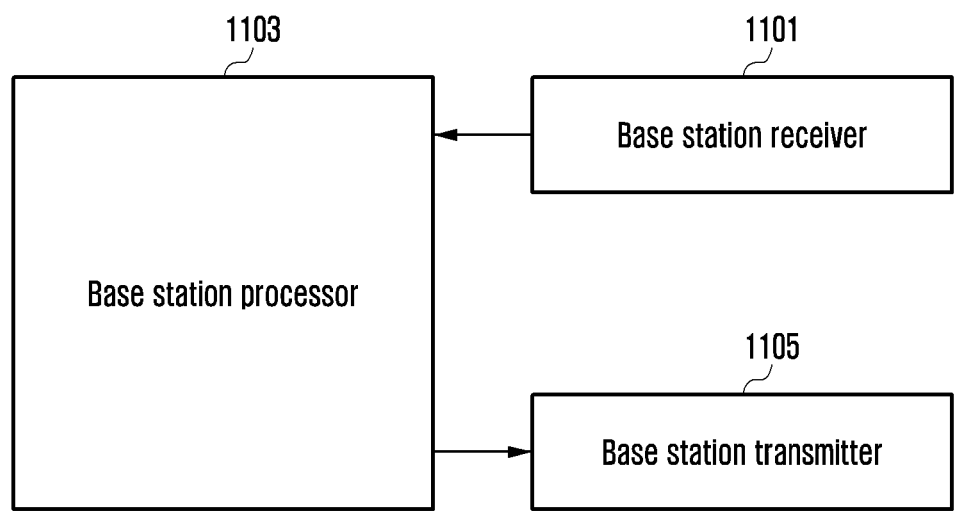
FIG. 11 is a block diagram illustrating a structure of a base station according to embodiments of the disclosure.

FIG. 11 is a block diagram illustrating a structure of a base station according to embodiments of the disclosure.

Referring to FIG. 11, in an embodiment, a base station may include at least one of a base station receiver 1101, a base station transmitter 1105, and a base station processor 1103. The base station receiver 1101 and the base station transmitter 1105 may collectively be referred to as a transceiver. The transceiver may transmit a signal to or receive a signal from a terminal. The signal may include control information and data. To this end, the transceiver may include an RF transmitter configured to perform up-conversion and amplification of a frequency of a transmitted signal, an RF receiver configured to perform low-noise amplification of a received signal and down-conversion of a frequency, and the like. Further, the transceiver may receive a signal via a radio channel, may output the signal to the base station processor 1103, and may transmit the signal output from the base station processor 1103 via the radio channel. The base station processor 1103 may control a series of procedures so that the base station operates according to the above-described embodiment of the disclosure.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Further, the above respective embodiments may be employed in combination, as necessary. Further, although the above embodiments have been described by way of the NR system, other variants based on the technical idea of the embodiments may also be implemented in other systems such as FDD or TDD LTE systems.

Further, although exemplary embodiments of the disclosure have been described and shown in the specification and the drawings by using particular terms, they have been used in a general sense merely to easily explain the technical contents of the disclosure and help understanding of the disclosure, and are not intended to limit the scope of the disclosure. It will be apparent to those skilled in the art that, in addition to the embodiments disclosed herein, other variants based on the technical idea of the disclosure may be implemented.

The invention claimed is:

1. A method performed by a user equipment (UE) of a communication system, the method comprising:
   receiving, from a base station, physical uplink control channel (PUCCH) configuration information including first information on a PUCCH format for repeated PUCCH transmissions, second information on a set of start symbols to be used in a slot, and third information on a set of number of symbols used in the slot;
   receiving, from the base station, downlink data based on a downlink control channel (DCI) for scheduling the downlink data; and
   repeatedly transmitting, to the base station, hybrid automatic repeat request acknowledgment (HARQ-ACK) information for the downlink data on a PUCCH based on the PUCCH configuration information,
   wherein a start symbol in the slot for at least one PUCCH transmission is determined based on the second information and the number of symbols in the slot for the at least one PUCCH transmission is determined based on the third information.

2. The method of claim 1, the method further comprising:
   transmitting, to the base station, UE-capability information on a required number of the repeated PUCCH transmissions,
   wherein a counted number of PUCCH transmissions for a termination of the repeated PUCCH transmissions are determined based on the required number of the UE-capability information.

3. The method of claim 1, wherein the HARQ-ACK information is transmitted based on the PUCCH format, and the PUCCH format is determined based on a number of consecutive uplink symbols.

4. The method of claim 1, wherein the HARQ-ACK information is transmitted on consecutive uplink symbols of different lengths during the repeated PUCCH transmissions.

5. A method performed by a base station of a communication system, the method comprising:
   transmitting, to a user equipment (UE) physical uplink control channel (PUCCH) configuration information including first information on a PUCCH format for repeated PUCCH transmissions, second information on a set of start symbols to be used in a slot, and third information on a set of number of symbols used in the slot;
   transmitting, to the UE, a downlink control channel (DCI) for scheduling of downlink data to the UE and the downlink data; and
   repeatedly receiving, from the UE, hybrid automatic repeat request acknowledgment (HARQ-ACK) information for the downlink data on a PUCCH based on the PUCCH configuration information,
   wherein a start symbol in the slot for at least one PUCCH transmission is determined based on the second information and the number of symbols in the slot for the at least one PUCCH transmission is determined based on the third information.

6. The method of claim 5, the method further comprising:
   receiving, from the UE, UE-capability information on a required number of the repeated PUCCH transmissions,
   wherein a counted number of PUCCH transmissions for a termination of the repeated PUCCH transmissions are determined based on the UE-capability information.

7. The method of claim 5, wherein the HARQ-ACK information is received based on the PUCCH format, and the PUCCH format is determined based on a number of consecutive uplink symbols.

8. The method of claim 5, wherein the HARQ-ACK information is received on consecutive uplink symbols of different lengths during the repeated PUCCH transmissions.

9. A user equipment (UE) of a communication system, the UE comprising:
   a transceiver configured to transmit or receive a signal; and
   a controller coupled with the transceiver and configured to:
      receive, from a base station, physical uplink control channel (PUCCH) configuration information including first information on a PUCCH format for repeated PUCCH transmissions, second information on a set of start symbols to be used in a slot, or and third information on a set of number of symbols used in the slot;
      receive, from the base station, downlink data based on a downlink control channel (DCI) for scheduling the downlink data; and
      repeatedly transmit, to the base station, hybrid automatic repeat request acknowledgment (HARQ- ACK) information for the downlink data on a PUCCH based on the PUCCH configuration information, wherein a start symbol in the slot for at least one PUCCH transmission is determined based on the second information and the number of symbols in the slot for the at least one PUCCH transmission is determined based on the third information.

10. The UE of claim 9, wherein the controller further configured to transmit, to the base station, UE-capability information on a required number of the repeated PUCCH transmissions, and wherein a counted number of PUCCH transmissions for a termination of the repeated PUCCH transmissions are determined based on the required number of the UE-capability information.

11. The UE of claim 9, wherein the HARQ-ACK information is transmitted based on the PUCCH format and the PUCCH format is determined based on a number of consecutive uplink symbols.

12. The UE of claim 9, wherein the HARQ-ACK information is transmitted on consecutive uplink symbols of different lengths during the repeated PUCCH transmissions.

13. A base station of a communication system, the base station comprising:

a transceiver configured to transmit or receive a signal; and a controller coupled with the transceiver and configured to:

transmit, to a user equipment (UE), physical uplink control channel (PUCCH) configuration information including first information on a PUCCH format for repeated PUCCH transmissions, second information on a set of start symbols to be used in a slot, and third information on a set of number of symbols used in the slot;

transmit, to the UE, a downlink control channel (DCI) for scheduling of downlink data to the UE and the downlink data, and repeatedly receive, from the UE, hybrid automatic repeat request acknowledgment (HARQ-ACK) information for the downlink data on a PUCCH based on the PUCCH configuration information, wherein a start symbol in the slot for at least one PUCCH transmission is determined based on the second information and the number of symbols in the slot for the at least one PUCCH transmission is determined based on the third information.

14. The base station of claim 13, wherein the controller is further configured to receive, from the UE, UE-capability information on a required number of the repeated PUCCH transmissions, and wherein a counted number of PUCCH transmissions for a UE of the repeated PUCCH transmissions are determined based on the UE-capability information.

15. The base station of claim 13, wherein the HARQ-ACK information is received based on the PUCCH format, and the PUCCH format is determined based on a number of consecutive uplink symbols.

16. The base station of claim 13, wherein the HARQ-ACK information is received on consecutive uplink symbols of different lengths during the repeated PUCCH transmissions.

* * * * *